(12) United States Patent
Ribbens et al.

(10) Patent No.: US 7,938,494 B2
(45) Date of Patent: May 10, 2011

(54) ANTILOCK BRAKING SYSTEMS AND METHODS

(76) Inventors: William B. Ribbens, Ann Arbor, MI (US); Ronald J. Fredricks, Grand Rapids, MI (US)

( * ) Notice: Subject to any disclaimer, the term of this patent is extended or adjusted under 35 U.S.C. 154(b) by 1094 days.

(21) Appl. No.: 11/715,567

(22) Filed: Mar. 8, 2007

(65) Prior Publication Data

US 2007/0222285 A1 Sep. 27, 2007

Related U.S. Application Data

(60) Provisional application No. 60/780,476, filed on Mar. 8, 2006.

(51) Int. Cl.
*B60T 8/86* (2006.01)

(52) U.S. Cl. .................................. 303/112; 303/126

(58) Field of Classification Search .......... 188/156–162; 303/112, 139, 150, 152, 126, 147, 148, 149, 303/167, 173

See application file for complete search history.

(56) References Cited

U.S. PATENT DOCUMENTS

| | | | |
|---|---|---|---|
| 4,336,592 A | 6/1982 | Beck | |
| 4,412,291 A | 10/1983 | Amberg et al. | |
| 4,679,866 A | 7/1987 | van Zanten et al. | |
| 4,715,662 A | 12/1987 | van Zanten et al. | |
| 4,828,334 A | 5/1989 | Salman | |
| 4,940,295 A | 7/1990 | Adachi et al. | |
| 4,946,015 A | 8/1990 | Browalski et al. | |
| 5,291,408 A | 3/1994 | Thatcher | |
| 5,409,302 A | 4/1995 | Chabbert | |
| 5,515,279 A | 5/1996 | Hrovat et al. | |
| 5,549,371 A | 8/1996 | Konaga et al. | |
| 5,564,796 A | 10/1996 | Saito et al. | |
| 5,918,951 A | 7/1999 | Rudd, III | |
| 5,951,122 A | 9/1999 | Murphy | |
| 6,104,148 A | 8/2000 | Kumar et al. | |
| 6,122,585 A | 9/2000 | Ono et al. | |
| 6,122,588 A | 9/2000 | Shehan et al. | |
| 6,266,600 B1 | 7/2001 | Miyazaki | |
| 6,270,172 B1 | 8/2001 | Shirai et al. | |
| 6,293,632 B1 | 9/2001 | Grote et al. | |
| 6,412,886 B1 | 7/2002 | Abe et al. | |
| 6,684,147 B2 | 1/2004 | Park et al. | |
| 6,890,041 B1 | 5/2005 | Ribbens et al. | |
| 7,013,208 B2 | 3/2006 | Park et al. | |
| 7,035,725 B1 | 4/2006 | Park et al. | |
| 2003/0052536 A1 | 3/2003 | Schneider et al. | |
| 2003/0151302 A1* | 8/2003 | Anwar | 303/112 |

OTHER PUBLICATIONS

Mark L. Akey, "Development of fuzzy logic, ABS control for commercial trucks", Magnavox Decision Support Systems Applied Center of Excellence, Fort Wayne in SPIE vol. 2493 Mar. 1995, pp. 359-370.

(Continued)

*Primary Examiner* — Christopher P Schwartz
(74) *Attorney, Agent, or Firm* — Joseph F Breimayer

(57) ABSTRACT

Improved anti-lock brake systems (ABS) employed on aircraft and land vehicles and methods of operating same employing a sliding mode observer (SMO) incorporated into an ABS algorithm requiring only measurement of wheel speed to regulate the application of braking torque are disclosed. Braking is optimized simply by maintaining an SMO estimate of differential wheel torque (road/tire torque minus applied brake torque) derived from wheel speed at an extremum via applying or releasing the brakes as the extremum is passed through.

25 Claims, 10 Drawing Sheets

OTHER PUBLICATIONS

Cem Unsal et al., "Sliding Mode Measurement Feedback Control for Antilock Braking Systems" (IEEE Transactions on Control Theory, Mar. 1999, vol. 7, pp. 271-281).

John A. Tanner et al, "Dynamics of Aircraft Antiskid Braking Systems", NASA Technical Paper 1959, 95 pages, Feb. 1982.

* cited by examiner

ANTILOCK BRAKING SYSTEMS AND METHODS

RELATED APPLICATION

This application claims priority to provisional U.S. Application Ser. No. 60/780,476 filed Mar. 8, 2006, for ANTILOCK BRAKING SYSTEMS AND METHODS, inventors William B. Ribbens and Ronald J. Fredricks.

TECHNICAL FIELD

The present invention pertains to antilock brake systems employed on aircraft and land vehicles, and particularly to an improved ABS and methods of operating same employing a sliding mode observer (SMO) incorporated into an ABS algorithm and control system employing measurement of wheel speed to regulate the application of the wheel brakes to optimize braking.

BACKGROUND

As is well known, a conventional aircraft and land vehicle braking systems are susceptible to a condition known as wheel lock during braking. This highly undesirable braking condition results from applying excessive brake torque to the wheel by the brake system that exceeds the maximum braking torque associated with the friction force between the tire and runway or road surface (herein ground/tire). The wheel lock condition normally results in a skid with, potentially, loss of vehicle directional control. Antilock brake systems (ABS) exist to try to prevent this undesirable condition and to provide optimal braking while maintaining acceptable vehicle directional controls. Prior art ABS detect undesirable braking conditions (e.g., wheel lock) and, by means of a control system and an electrohydraulic or electromechanical actuator, attempt to regulate braking to achieve the desired performance.

Brake systems, whether for aircraft or land vehicles, function by applying a retarding torque to the braked wheels of the vehicle that is in a direction opposite to the rotational direction of the wheel as the vehicle moves across a road or runway surface or any other surface (hereafter referred to as a "ground surface" regardless of actual surface type). The actual braking force that decelerates the vehicle is a function of wheel slip, i.e. the difference between the translational velocity of the vehicle (relative to the wheel axis) and the corresponding translational velocity of the wheel at the contact point with the ground surface. This braking force is directed opposite to the vehicle velocity vector and results from sliding friction between the tire and the ground surface, since the contact point is really a patch with a finite area.

An ABS system that is based upon a so-called Sliding Mode Observer (SMO) is disclosed in U.S. Pat. No. 6,890,041. In certain embodiments disclosed in the '041 patent, an SMO based estimate of net or differential wheel torque derived from the measured wheel speed is compared to a threshold differential wheel torque that may be derived as a function of a "skid signal", also based on wheel speed only, to generate a braking or actuator control signal. The actuator control signal can be employed to rapidly and fully applying and releasing the brakes in a binary on-off manner and, as an additional option, modulating the maximum available brake hydraulic pressure or electrical current when the brakes are in the "on" state in a continuous manner. In the case of the basic on-off component of braking, the brakes are released when the estimate of differential wheel torque is less than the threshold differential wheel torque (i.e. for relatively high values of brake torque), and the brakes are applied fully when the estimate of differential wheel torque is greater than or equal to the threshold differential wheel torque. For aircraft landing gear applications, a fore-aft accelerometer mounted on the landing gear can be used to suppress nonlinear gear displacement oscillations commonly called gear walk in the direction of wheel roll.

The '041 patent describes the theory of SMO operation, the prior art, and a number of preferred embodiments in extensive detail and is incorporated by reference in its entirety herein.

In certain embodiments of the '041 patent, the threshold differential wheel torque is determined by an algorithm from past wheel speed measurements. The threshold differential wheel torque is continuously computed and compared with the estimated differential wheel torque output by the SMO. The threshold differential wheel torque is dynamically varied in accordance with the estimated differential wheel torque value and a separately calculated "skid-signal" also based on wheel angular speed only, favoring brake release as the skid signal increases and brake application as the skid signal decreases. The brakes for each wheel being controlled are released when the estimated differential wheel torque falls below the threshold differential wheel torque (on/off command signifying "off" or exhibiting "off-command"), and the brakes are applied fully (on/off command signifying "on" or exhibiting "on-command") when the estimated differential wheel torque exceeds the threshold differential wheel torque in a limit cycle control system.

Generic electromechanical and electrohydraulic brake actuators were disclosed in the above-referenced '041 patent that operate fully "on" and fully "off" when the vehicle operator applies and releases the brakes, respectively. These on/off, i.e. switched, brake actuators typically employ solenoids that move essentially instantaneously. Switched brake actuators are typically found on general aviation and business aircraft and in automobiles and many trucks. However, it must be realized that the braking torque does not instantly follow the solenoid on/off command as the brakes themselves are electromechanical or electrohydraulic systems and changes in such systems cannot be instantaneous by the laws of nature.

The SMO-based control systems disclosed in the '041 patent were also designed to be compatible with controllers for "proportional brake actuators" that are commonly employed in large transport type aircraft, for example. Such proportional brake actuators have fairly involved transfer functions that translate an electrical input generated by a "brakes on" command into an applied brake torque applied to the wheels. As with a discrete actuator, when the pilot engages or releases the brakes using a continuous or proportional actuator the braking torque is not instantly fully "on" or fully "off".

The determination of an appropriate threshold differential wheel torque under variable braking conditions can be complex, particularly in the case of continuous or proportional actuators employed in commercial aircraft. The algorithm for determination of a skid signal or an estimated skid signal might have to be tailored to take into account characteristics of braking systems of each particular aircraft. It would be desirable to avoid doing so and provide a universally acceptable SMO-based braking controller, particularly for use in such commercial aircraft braking systems.

SUMMARY

We have discovered that a sufficient and efficacious actuator control signal can be developed from the estimated differential wheel torque output by the SMO from measured wheel speed alone. Advantageously, it is unnecessary to derive a threshold differential wheel torque and to compare it with the estimated differential wheel torque to derive the actuator control signal.

In the preferred embodiments, occurrence of extrema (relative maximums and/or minimums) observed in the differential wheel torque output from the SMO can be employed to directly calculate an actuator control signal. These extrema of differential wheel torque occur almost simultaneously with the occurrence of relative maxima of the ground/tire friction coefficient. Detection of the extrema of differential wheel torque enables optimal braking control of the vehicle by regulating the applied brake torque to maintain the ground/tire friction near its peak value during heavy braking.

In certain embodiments, the occurrence of an unwanted and unexpected braking condition, e.g., an excessive slip condition (a deep skid) or, conversely, insufficient and persistent under-braking is detected and the brakes are released, as a safety feature, while the unwanted braking condition persists. Possible signals that may be used for detecting a deep skid and/or persistent under-braking include the wheel speed measurement itself, a nose wheel speed signal developed from an unbraked aircraft nose wheel, and the differential wheel torque estimate from the SMO possibly in combination with brake pressure or brake torque measurements.

Advantageously, the systems and methods of the present invention may be employed in simple and efficacious actuator control systems for both switched and proportional actuators for aircraft and land vehicles.

This summary is presented here simply to point out some of the ways that the invention overcomes difficulties presented in the prior art and to distinguish the invention from the prior art and is not intended to operate in any manner as a limitation on the interpretation of claims that are presented initially in the patent application and that are ultimately granted. The various features of the invention described herein can be practiced alone or in combinations disclosed herein or later developed.

BRIEF DESCRIPTION OF THE DRAWINGS

Other advantages and features of the present invention will be readily appreciated as the same becomes better understood by reference to the following detailed description when considered in connection with the accompanying drawings, in which reference numerals designate like parts throughout the figures thereof and wherein.

DETAILED DESCRIPTION OF PREFERRED EMBODIMENTS

Figure 1A:
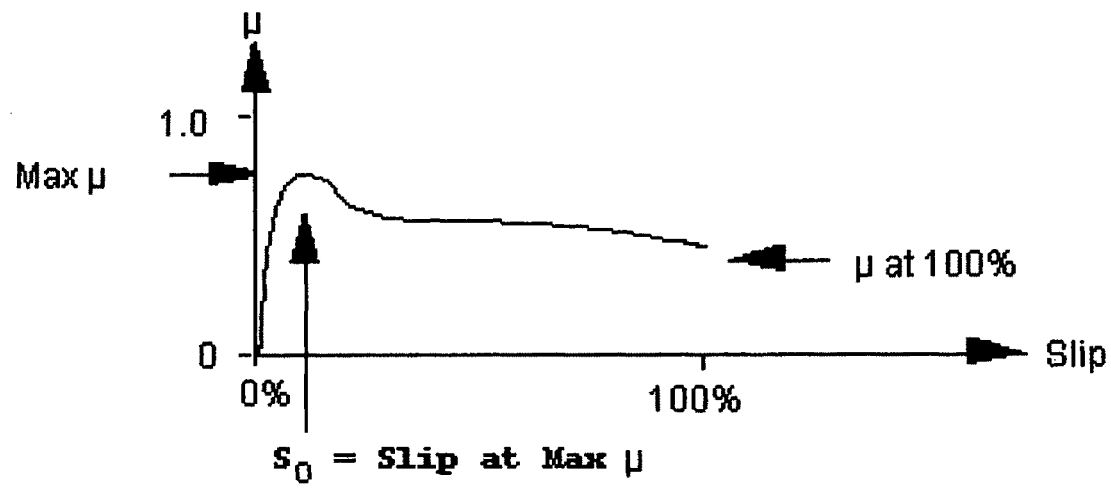
FIG. 1(a) is a typical μ-slip plot taken from FIG. 1 of the above-referenced '041 patent.

The following terminology and symbolic representations are used herein that are similar in certain instances to those employed in the above-referenced '041 patent:

$T_a$=applied brake torque is the torque that is applied to each braked wheel by the brake system.

$T_b$=braking or "drag" torque is the torque applied to each braked wheel by the friction force between the associated tire and the road/runway surface.

$\delta T_b$=differential wheel torque is the algebraic difference between the drag torque and the applied brake torque to the wheel under question ($\delta T_b=T_b-T_a$). Note that $\delta T_b$ was sometimes defined as differential brake torque or differential braking torque in the '041 patent. However, these latter terms may be ambiguous to one not sufficiently skilled in the art of vehicle braking and so their use will be avoided herein.

$\delta T_{be}$=estimated differential wheel torque is an estimate of $\delta T_b$ derived from wheel angular speed measurements by the SMO.

The present invention is applicable to ABS systems in which the brake actuator is either a switched electrohydraulic or electromechanical actuator ("switched brake actuator" herein) or a proportional (continuously variable) electrohydraulic or electromechanical actuator ("proportional brake actuator" herein). Switched brake actuators used in automotive and certain truck braking systems are also commonly referred to as brake pressure modulators. Switched brake actuators generally incorporate switched (i.e., binary state) solenoids to apply or remove hydraulic or mechanical pressure to the brake. It will be understood by a person of skill in the art that a proportional brake actuator can be used instead of a switched brake actuator in preferred embodiments of the present invention by providing an actuator control signal that has at least a switched component that is applied directly to the brake actuator or is superimposed on a relatively slowly changing component (if present) of the control signal that is applied to the proportional brake actuator.

For the purposes of the present patent application the term "proportional electrohydraulic actuator" refers to a component in which brake pressure that is transmitted from the source of pressurized hydraulic fluid (e.g., master cylinder) to the wheel cylinder incorporates a component that is continuously variable with respect to the electrical signal. For example, such a device could consist of a valve that is operated by a variable area (i.e., so-called proportional) solenoid. For such a structure, the solenoid armature and its connected valve are continuously variable and controlled by the input electrical signal (e.g., current). The brake pressure transmitted by the valve is continuously variable over a range and is regulated by the continuously variable electrical signal (e.g., pressure varies linearly with an electrical signal such as current). A person of skill in the art will understand that there are many structures and configurations that can achieve a "proportional" relationship between the electrical signal and brake pressure.

Also for the purposes of the present patent application, a switched electrohydraulic actuator incorporates a binary state regulation of brake pressure. For example, a switched actuator can be implemented with one or more valves that are moved by corresponding one or more binary state solenoids (e.g., a variable gap solenoid). Such a solenoid has only two stable armature positions as determined by mechanical stops. The valve that is connected to this binary state solenoid also has two positions. The brake pressure that is transmitted by such a binary state solenoid/valve structure changes rapidly with the switched valve position.

Similar definitions hold for electromechanical actuators except the brake pressure is replaced by a mechanical source of applied brake torque (e.g. an electric motor with an associated electric current regulator and gear mechanism).

In addition either type of actuator may suffer from fading and/or hysteresis effects and these effects must all be properly accounted for in the design of proper brake actuator logic although they are not part of this invention per se. The present invention is designed to be applicable to all types of actuators.

FIG. 1(a) depicts a typical μ-slip relationship of friction coefficient μ with wheel slip S. As shown in FIG. 1(a), the slip S and friction coefficient μ are essentially zero for, a rolling wheel/tire. The application of brake torque $T_a$ to the rolling wheel causes slip S to increase from zero with an initially increasing friction coefficient μ. There is a value of slip S that results in a peak value for the friction coefficient $\mu_p$ for any given vehicle, tire, and ground surface condition. This optimum value of slip S for maximizing wheel surface friction will be denoted by optimal slip $S_o$ in the following.

In a conventional brake system, continued application of brakes causes wheel lock resulting in a decline in friction coefficient μ from the peak friction coefficient $\mu_p$, which is well known to be unfavorable for braking and a cause of tire wear. The primary ABS goal is to regulate applied brake torque $T_a$ such that friction coefficient μ remains as close as possible to the peak friction coefficient $\mu_p$ shown in FIG. 1(a), thereby maximizing deceleration for a given applied brake torque $T_a$. ABS methods described in the prior art have generally involved instrumentation and/or computer algorithms for directly estimating the instantaneous slip S. It has been assumed in some of these methods that a single value for optimal slip (e.g., $S_o$=0.13) is representative of all ground surface conditions or is sufficiently close to the true optimal slip $S_o$ that the braking performance is acceptable although sub-optimal. The ABS brake controller then simply regulates brake hydraulic pressure of a hydraulic braking system or electrical current applied to an electromechanical braking system so as to maintain the estimated instantaneous slip value S near true optimal slip $S_o$.

In accordance with preferred embodiments of the present invention, it is recognized that the relative peak friction coefficient $\mu_p$ at true optimal slip $S_o$ is reflected in an extremum of estimated differential wheel torque $\delta T_{be}$ derived by an SMO from wheel speed ω. As explained below, preferred ABS embodiments of the present invention regulate braking by a switched or proportional brake actuator to maintain the friction coefficient μ at or near the peak friction coefficient $\mu_p$. The brakes are applied and released each time the proper extremum, a maximum for the definition of differential wheel torque used here, and under the assumption of a sufficiently fast response from the brake actuator, is detected from the estimated differential wheel torque $\delta T_{be}$.

As explained in the above referenced '041 patent, the SMO is a type of state estimator that is highly robust with respect to un-modeled dynamics or unknown or poorly known plant models. In the embodiments of the present invention, the SMO receives, as its input, a signal that is or yields a measurement of wheel speed ω and generates, as its output, an estimated differential wheel torque $\delta T_{be}$ that is very close to true differential wheel torque $\delta T_b$. As demonstrated below, changes in the dynamically varying friction coefficient μ are reflected by changes in the estimated differential wheel torque $\delta T_{be}$. The extrema of the estimated differential wheel torque $\delta T_{be}$ on each braked wheel essentially coincides in time with the relative maximum of the friction coefficient $\mu_p$ at optimal slip $S_o$ of the tire and road/runway surface.

In preferred embodiments of the present invention, the extrema of the estimated differential wheel torque $\delta T_{be}$ on each braked wheel are detected and used to generate a primary actuator control signal that functions as actuator control signal $U_a$, in the absence of an undesirable slip condition, e.g., a deep skid, or an insufficient and persistent under-braking, as described further below. The actuator control signal $U_a$ has a first state or value, e.g., "1" that commands the brakes remain "on" or a second state or value, e.g., "0" that commands the brakes "off". As explained further below, the state of the actuator control signal $U_a$ is changed to the second state upon when and as long as an undesirable slip condition, e.g., a deep skid, is detected, whereby the brake actuator is commanded "off" thereby interrupting braking and causing the applied brake torque $T_a$ to decrease.

Figure 1B:
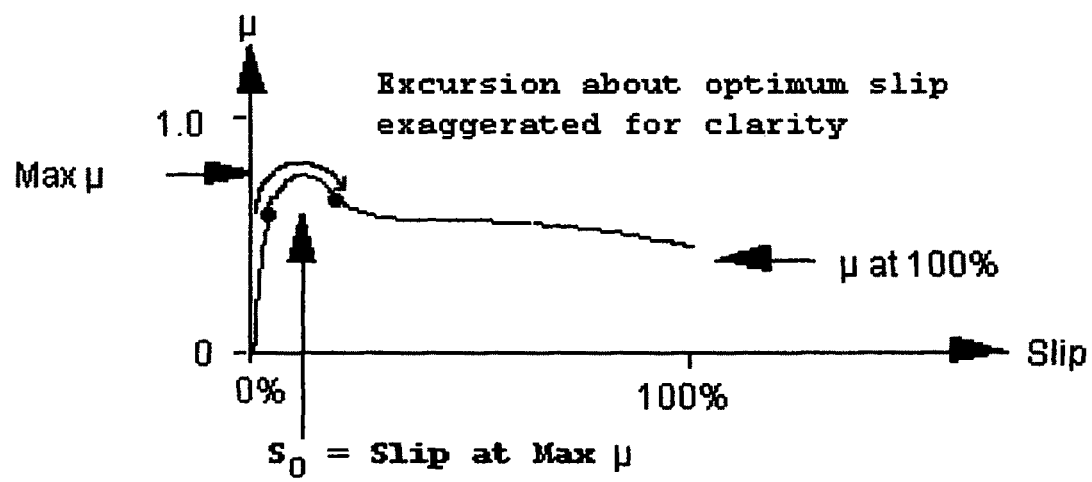
FIG. 1(b) is a μ-slip plot exhibiting a condition of increasing slip under SMO control illustrating an extremum when an "off" braking command should be applied to the brake actuator.
Figure 1C:
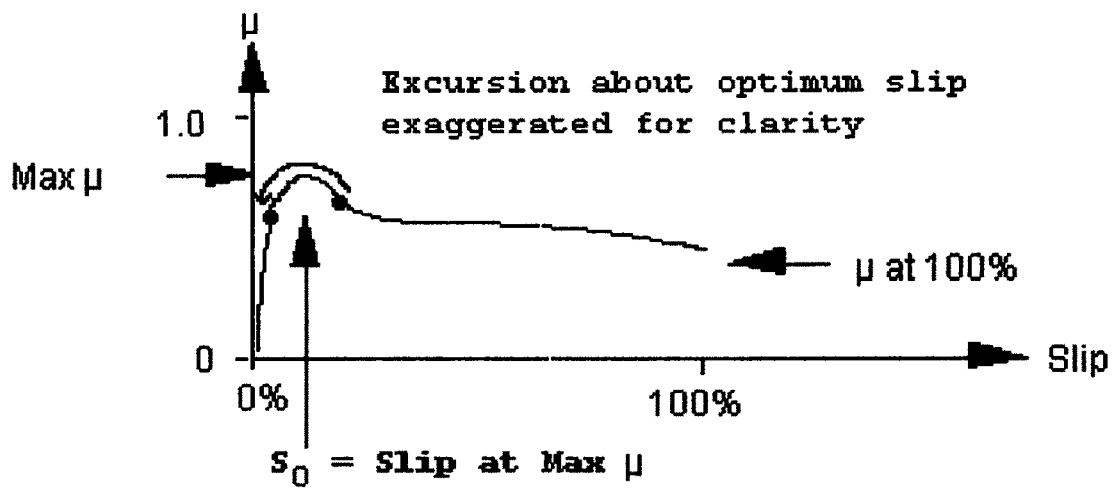
FIG. 1(c) is a μ-slip plot exhibiting a condition of decreasing slip under SMO control illustrating an extremum when an "on" braking command should be applied to the brake actuator.

During normal braking with ABS inactive, the actuator control signal $U_a$ output from the SMO controller is by default in a first or "on" state but is ignored by the brake actuator, and braking control transfers to the pilot/drivers engagement of the brake pedal. During a period of heavy braking with ABS active and assuming that an undesirable slip condition is not present, when the actuator control signal $U_a$ is in the first state, the brake actuator is commanded "on" and the applied brake torque $T_a$ increases, thereby causing slip S to increase and the friction coefficient μ to reach the peak friction coefficient μ as depicted by in FIG. 1(b). In accordance with embodiments of the present invention, the actuator control signal $U_a$ changes state upon each detection of an extremum of estimated differential wheel torque $\delta T_{be}$ as long as the pilot/driver is engaging the brakes. When the actuator control signal $U_a$ is changed to the second state upon detection of an extremum of estimated differential wheel torque $\delta T_{be}$, braking is interrupted, and the applied brake torque $T_a$ reduces at a rate determined by the wheel/brake dynamics As the applied braking torque $T_a$ is reduced, the wheel slip S begins to be reduced, since wheel speed is increased by the ground/tire friction. As the wheel slip S is reduced, the friction coefficient μ is again momentarily maximized at peak friction coefficient $\mu_p$ as depicted in FIG. 1(c), and the actuator control signal $U_a$ is changed to an back to the first state. Commanding the brake actuator back "on" restores braking and causes the applied brake torque $T_a$ to rapidly increase, thereby causing slip S to once again increase until friction coefficient μ reaches the peak friction coefficient $\mu_p$ as depicted in FIG. 1(b). The systems and methods of the present invention cause the applied brake torque $T_a$ to oscillate in a manner that maintains the friction coefficient μ very near its peak value $\mu_p$ corresponding to optimal slip $S_o$.

Owing to the dynamics of the wheel/brake system, in the brakes "on" condition, the friction coefficient μ will drop slightly below its peak value $\mu_p$ before the brakes "off" command from the actuator control signal causes the applied brake torque $T_a$ to decrease and slip S to be reduced. Similarly, in the brakes "off" condition, the friction coefficient μ will drop slightly below its peak value $\mu_p$ before the brakes "on" actuator control signal causes the applied brake torque $T_a$ to increase and slip S to be increased. During normal ABS operation, the friction coefficient μ will oscillate about, but remain close to, the peak friction coefficient $\mu_p$.

Figure 2:
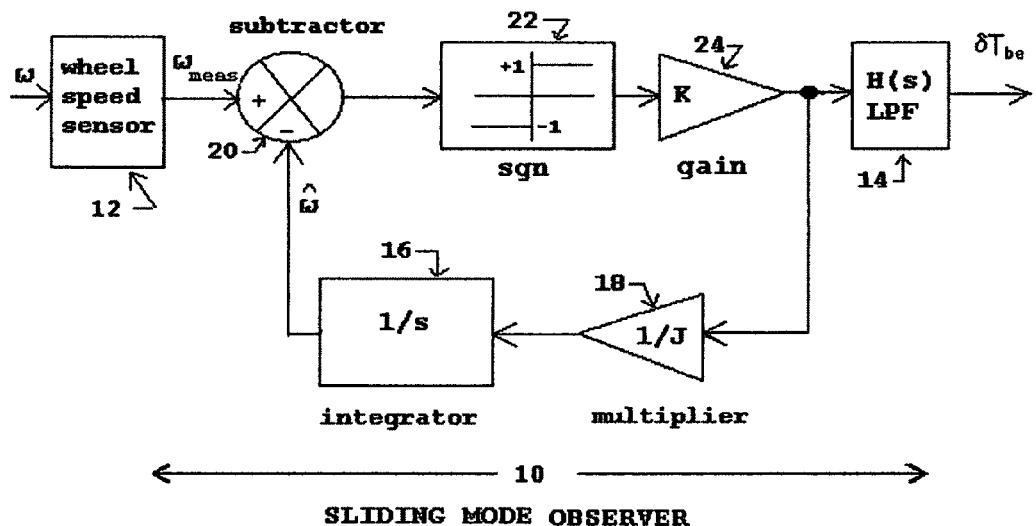
FIG. 2 is a block diagram of the SMO estimator according to FIG. 2 of the '041 patent.

Referring in detail now to FIG. 2, it is a block diagram of an SMO embodiment having a single state variable. The single state SMO is introduced here to simplify the understanding of the present invention. However, it will be understood from the theory of SMO that more states can improve the accuracy of the estimate in certain embodiments. In FIG. 2, the SMO 10 receives the measured wheel angular speed ω from a conventional wheel speed sensor 12 of an ABS equipped brake assembly on each vehicle wheel and generates an estimate of the actual differential wheel torque $\delta T_b$. The measured wheel angular speed ω is combined with the SMO generated internal estimate of wheel speed $\hat{\omega}$ in subtraction block 20, and the resulting signal, $\omega-\hat{\omega}$, is processed in the Sign function block 22 as described further below. The output of the Sign function block 22 is passed through a gain stage 24 and then low pass filtered in LPF block 14 to provide the estimated differential wheel torque $\delta T_{be}$. The gain stage 24 controls the responsiveness of the SMO 10 to changes in wheel angular speed error and must be sufficiently greater than zero to guarantee stability of the SMO estimate for wheel angular speed $\hat{\omega}$. Typically, computer simulation is used to optimize this gain for a given vehicle ABS application. The output of the gain stage 24 is also passed through another gain multiplier stage 18 and an integrator stage 16 to provide the estimated wheel angular speed $\hat{\omega}$. Note that the "s" appearing in the integrator stage 16 in FIG. 2 is the Laplace frequency domain variable and is not to be confused with the slip S. These stages and blocks of the SMO 10 depicted in FIG. 2 are normally implemented in software assuming a suitable analog to digital converter is employed at the output of the wheel speed sensor 12 or the sensor output is already in a digital format.

The SMO function is based upon the simplified dynamic model for a braked wheel namely:

$$d/dt\{\omega\} = \Delta T/J, \quad (1)$$

where J=wheel moment of inertia (including all rotating parts such as the rim and tire) and d/dt denotes a time derivative.

The corresponding SMO differential equation for the SMO's internally estimated value of the wheel angular speed, $\hat{\omega}$, assuming an accurate measurement of the true wheel angular speed ω by sensor 12 is given by:

$$d/dt\{\hat{\omega}\} = K^*\mathrm{Sgn}(\omega_{meas}-\hat{\omega}) \approx K^*\mathrm{Sgn}(\omega-\hat{\omega}), \quad (2)$$

where Sgn is the so-called Sign function block 22 and the measured wheel angular speed $\omega_{meas}$ is almost always very close to the (true) wheel angular speed ω as noted earlier. K is chosen for stability according to the well-known theory of Sliding Mode Observers.

The low pass filter 14 in the block diagram of SMO 10 outputs the estimated differential wheel torque $\delta T_{be}$. While many choices are available for the design of the low pass filter 14, the smoothing it affords is essential to obtain a useable estimate of differential wheel torque in a SMO-based ABS. For example, with a first order filter design the low pass filter transfer function H(s) is given by:

$$H(s) = a/(s+a), \quad (3)$$

where a=the filter bandwidth, and s=the complex, Laplace, frequency variable. The output of this filter is the estimated differential wheel torque $\delta T_{be}$. As already noted, although an SMO can estimate state vectors with multiple state variables, the present invention incorporates an SMO 10 processing just a single input state variable, namely angular wheel speed ω, for each wheel and providing a single output variable for each wheel, namely the estimated differential wheel torque $\delta T_{be}$. However, additional inputs to the full ABS control system built around the single state SMO can be used in accordance with our invention to further improve performance as will be described in the following embodiments. These secondary inputs may include a direct measure of the applied brake torque, $T_a$, in those situations where an electric brake is employed and torque sensing can be accomplished economically, or an indirect and approximate measure of the applied brake torque using brake cylinder pressure in the case of an electrohydraulic actuator, and/or external measurements of the aircraft velocity from a separate wheel speed sensor mounted in the nose wheel. Additional improvements in SMO performance can be achieved for certain embodiments from an SMO having more than a single state variable.

The following equations (4)-(7) demonstrate how the estimated differential wheel torque $\delta T_{be}$ derived from wheel speed ω tracks the friction coefficient μ(S), i.e., the friction coefficient μ at an instantaneous slip S. The estimated differential wheel torque $\delta T_{be}$ can therefore be employed in a controller of a control system to regulate the applied brake torque $T_a$ such that the wheel braking torque $T_b$ remains near its maximum.

The braking torque $T_b$ for a given constant tire load N (e.g., land vehicle or aircraft weight acting on the wheel) is proportional to the friction coefficient μ of the tire/road or ground/tire as described in the following set of equations. It is well known that the friction coefficient $\mu_p$ is a nonlinear function of tire slip S defined as:

$$S = \frac{V - \omega * r}{V}, \quad (4)$$

where V=vehicle speed, ω=wheel speed, and r=effective tire radius.

The dynamic response of the wheel angular speed ω to the applied and braking torque is given (to very close approximation) by:

$$J_w d\omega/dt = T_b - T_a + f(v,\omega) \approx \delta T_b, \quad (5)$$

where f(v,ω)=a friction term that is relatively small compared to $\delta T_b$.

The preferred embodiments of the present invention do not require an estimate of or a measurement of either friction coefficient μ or tire slip S but rely upon the linear relationship between the braking torque $T_b$ and the friction coefficient μ. For a constant tire load N, the braking torque $T_b$ is determined from the tire radius r and the friction coefficient μ:

$$T_b = rN\mu. \quad (6)$$

In particular, the braking torque $T_b$ is maximal when friction coefficient μ is maximal, i.e., at the optimal slip $S_o$, as shown in FIGS. 1(a)-1(c), for example. For a runway or road with varying conditions (snow vs. dry for example) the optimal value of S and the associated peak value of μ, $\mu_p$, might vary as the vehicle proceeds along and the surface conditions change. However the μ-slip curve is unimodal, i.e., has but one single peak at any location on the surface.

The differential wheel torque $\delta T_b$ is defined as the algebraic difference between braking torque $T_b$ and applied brake torque $T_a$ and therefore can be characterized as:

$$\delta T_b = rN\mu - T_a. \quad (7)$$

For ease in understanding the present invention assume the applied brake torque $T_a$ changes instantly between the two commanded values associated with the actuator control signal $U_a$, namely fully "on" and fully "off" in the case of a switched brake actuator and continuously "on" and continuously "off" in the case of a proportional brake actuator. Thus, if the applied brake torque $T_a$ is constant except during brake actuator command changes, then the differential wheel torque $\delta T_b$ dynamically follows or tracks $\mu(S)$ at almost all points in time. The SMO 10 provides a continuous estimate of differential wheel torque $\delta T_{be}$ from wheel speed $\omega$ that is closely correlated to the true differential wheel torque $\delta T_b$. Consequently, the estimated differential wheel torque $\delta T_{be}$ reflects $\mu(S)$ without having to know either the friction coefficient $\mu$ or the slip S. The estimated differential wheel torque $\delta T_{be}$ output by the SMO 10 exhibits an extremum when the friction coefficient $\mu$ is at a relative maximum or peak value $\mu_p$. Practically, the applied brake torque varies rapidly enough with many brake actuators that a relative maximum of differential wheel torque occurs very near the time of the relative maximum of $\mu$. Even a "slow" response, brake actuator can be advantageously used, although it may be desirable to detect both relative maximums and relative minimums of estimated differential wheel torque $\delta T_{be}$, i.e. the extrema. In that case, the drive logic 46 for computing the actuator control signal $U_a$ at each such detected extremum becomes slightly more complicated but within the capabilities of a person of skill in the art.

Preferred embodiments of the braking systems and methods of the present invention incorporate a control system employing the SMO 10 to develop an estimated differential wheel torque $\delta T_{be}$ from wheel speed $\omega$, as explained above, and a controller to regulate applied brake torque $T_a$ that is applied to an aircraft or land vehicle wheel brake. The controller detects the extremum of the estimated differential wheel torque $\delta T_{be}$ output by the SMO 10 to trigger switching of the state of the actuator control signal $U_a$ as described above with respect to FIGS. 1(*b*) and 1(*c*).

Advantageously, there is no need to compute the dynamically varying threshold on the estimated differential wheel torque $\delta T_{be}$ that was employed in preferred embodiments disclosed in the '041 patent to determine whether the brakes should be applied or released. Operation at or very near to the peak friction coefficient $\mu_p$ automatically occurs when a switched or proportional brake actuator is used in accordance with preferred embodiments of the present invention.

Furthermore, the determination or estimation of wheel slip S is unnecessary in either a switched brake actuator or proportional brake actuator brake system in the process of developing an applied brake torque $T_a$, although a wheel slip estimate $S_e$ may still be made strictly as a safety back-up. This safety back-up estimate of slip S can be used in certain embodiments to prevent a deep skid by releasing the brakes (entirely in the case of a switched brake actuator or continuously in the case of a proportional brake actuator) until an extremum in differential wheel torque is again observed.

It should be noted that an extremum of the estimated differential wheel torque $\delta T_{be}$ might be a relatively positive or negative value. Assuming a sufficiently fast brake actuator (one with sufficient bandwidth) one may always substitute "maximum" or "peak" for "extremum" when differential wheel torque $\delta T_b$ is defined algebraically as ground/tire braking torque $T_b$ minus applied brake torque $T_a$ as set forth above. However, if differential wheel torque $\delta T_b$ is defined algebraically as applied brake torque $T_a$ minus braking torque $T_b$, the extrema of interest in the estimated differential wheel torque $\delta T_{be}$ output by the SMO would always be the minimum or "valley" of the estimated differential wheel torque $\delta T_{be}$ again given a sufficiently fast responding brake actuator. Regardless of the differential wheel torque sign convention chosen and regardless of the brake actuator's response time, it is always at an extrema of the estimated differential wheel torque $\delta T_{be}$ that the brake actuator is either commanded "on" or "off".

As described above with respect to FIGS. 1(*b*) and 1(*c*), the implementation of braking systems in accordance with the present invention involves modulating or regulating the applied brake torque $T_a$ to maintain the ground/tire friction coefficient $\mu$ at or near a relative maximum friction coefficient $\mu_p$. This concept can be further understood by considering the dynamic behavior of the estimated differential wheel torque $\delta T_{be}$ following the onset of applied brake torque $T_a$.

As a further aid in describing preferred embodiments of the invention, assume a switched brake actuator, although the description of braking for a proportional brake actuator is very similar but with the brakes "on" or the brakes "off" command not necessarily implying the brakes are commanded fully "on" or commanded fully "off". For simplicity in the explanation, and as mentioned before, further assume that applied brake torque $T_a$ instantaneously changes from zero to a steady value or at least rapidly enough that brake actuator dynamics do not affect when to switch the brakes "on" or "off". Then, the extrema at which switching occurs will always be a relative maximum in $\delta T_{be}$. The wheel and tire are initially assumed to be rolling at a wheel speed $\omega$ with essentially zero slip S. Slip S increases as the wheel speed $\omega$ is slowed by the applied brake torque $T_a$ (i.e., the applied brake torque $T_a$ is acting in a vector direction so as to oppose the wheel speed $\omega$). Assuming further that the tire load N is essentially constant, then the braking torque $T_b$ increases with time t in proportion to the friction coefficient $\mu$ and wheel slip S (i.e., $\mu[S(t)]$). The braking torque $T_b$ initially increases, then reaches a relative maximum at optimum slip $S_o$, and then begins to decrease as slip S increases beyond the optimum slip $S_o$ as illustrated by FIGS. 1(*a*)-1(*c*) where:

$$\mu(S_o) = \mu_p = \max[\mu(S)]. \quad (8)$$

In accordance with all embodiments of the present invention and assuming a sufficiently fast brake actuator so that the extrema of interest of estimated differential wheel torque $\delta T_{be}$ are all relative maximums, a controller detects that the estimated differential wheel torque $\delta T_{be}$ has maximized and is decreasing. Under the condition the brake actuator is already commanding brakes "on", the controller responds to the relative maximum of estimated differential wheel torque $\delta T_{be}$, by issuing a command to the brake actuator to cause the applied brake torque $T_a$ to decrease. At this point, the wheel speed $\omega$ begins to increase due to the action of the applied brake torque $T_a$ (acting in a direction to increase wheel speed). The wheel speed $\omega$ increase corresponds to a decrease in slip S, since vehicle speed remains essentially constant in the absence of braking. The differential wheel torque $\delta T_b$ increases momentarily as slip S is reduced towards optimum slip $S_o$. The differential wheel torque $\delta T_b$ reaches a maximum essentially at $S=S_o$ and then begins to decrease.

Under the condition when the sufficiently fast brake actuator is already in the brakes "off" state, and the controller senses an extrema of estimated differential wheel torque $\delta T_{be}$, the controller commands the brake actuator to cause the applied brake torque $T_a$ to increase. The applied brake torque $T_a$ acts to increase slip S, and the true differential wheel torque $\delta T_b$ again passes through a relative maximum. Once the controller senses a decrease in differential wheel torque $\delta T_b$ from its relative maximum under the condition of brakes applied, it then commands the brake actuator to brakes "off" and the process repeats. The controller toggles the actuator control signal $U_a$ alternately "on" and "off" in a limit cycle operation. Cycling of the applied brake torque $T_a$ up or down then occurs in response, and it causes slip S to oscillate within a narrow range above and below optimum slip $S_o$.

Figure 3:
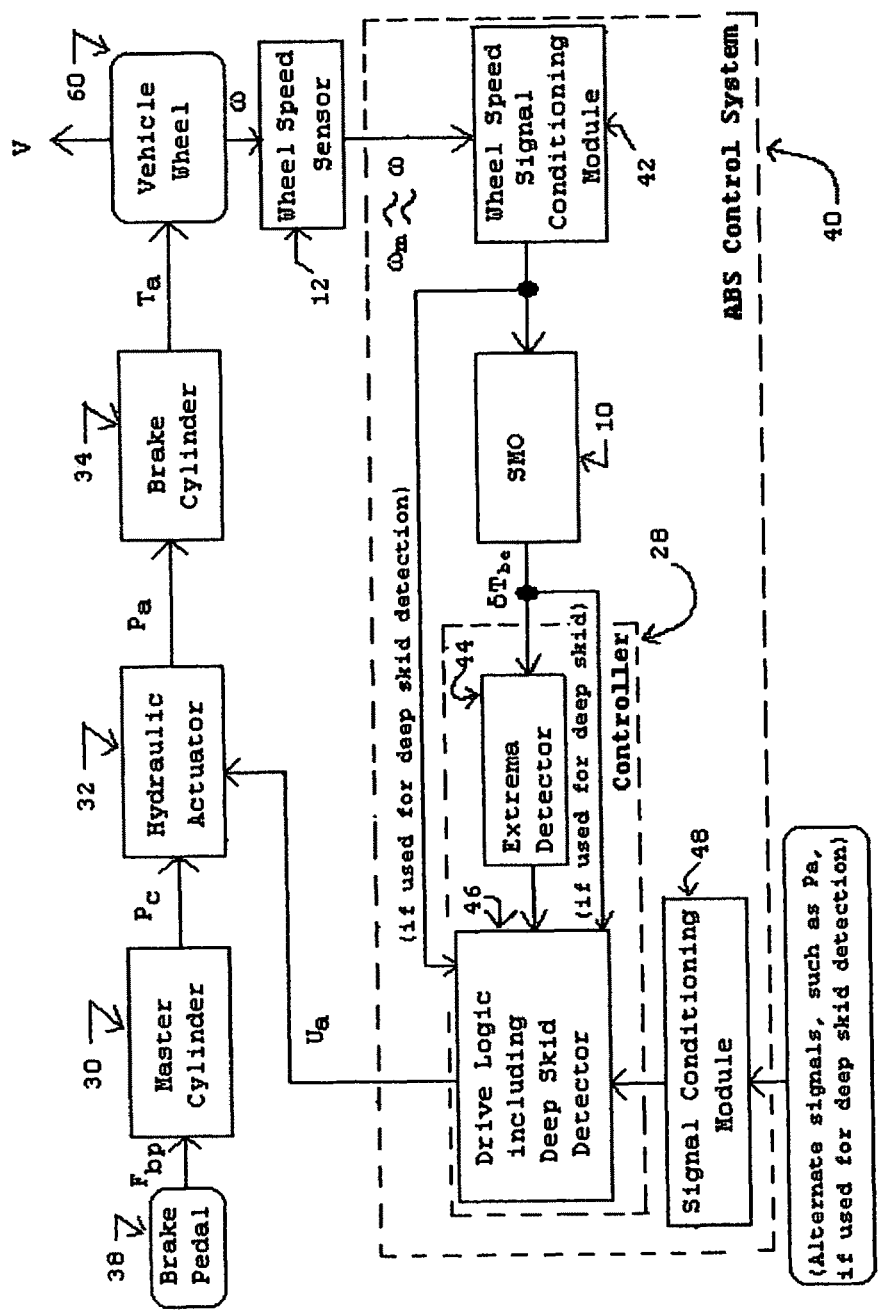
FIG. 3 is a block diagram of a preferred embodiment of the invention for an SMO based ABS using a switched or proportional electrohydraulic actuator.

A first embodiment of an ABS control system 40 implemented in a vehicle (a land vehicle or aircraft) embodying the operations describe above is depicted in FIG. 3 assuming an electrohydraulic brake actuator, either switched or proportional. The braking system of the vehicle comprises a pilot/driver operated brake control, e.g., a brake pedal 38, and a conventional source of hydraulic pressure 30, e.g., a standard master cylinder, which is coupled to a switched brake pressure, electrohydraulic modulator or brake actuator 32 and brake cylinder 34 of each braked vehicle wheel 60. This hydraulic pressure source may, in certain applications, include a separate source of pressure (e.g., an accumulator) for braking systems requiring "power assist." A brake pedal force $F_{bp}$ is generated when the brake pedal 38 is depressed by the pilot/driver that causes pressurized hydraulic brake fluid $P_c$ to be delivered through a suitable high-pressure conduit to the brake actuator 32 of each braked vehicle wheel 36. The hydraulic brake actuator 32 may be of any known type incorporating a mechanism that responds to an ABS actuator control signal to interrupt the actuator pressure $P_a$. Under normal braking conditions (i.e., no skid conditions) the master cylinder pressure $P_c$ is passed through the brake actuator 32 without diminution as the actuator pressure $P_a$ to brake cylinder 34 (e.g., a conventional brake caliper system or disk or other well-known mechanism for applying brakes to a wheel) which applies brake torque $T_a$ to the wheel 60 resulting in normal brake action. At this point, the applied brake torque $T_a$ acts upon the wheel/brake assembly to brake the vehicle wheel 60. As explained above, the applied brakes in conjunction with the tire and ground surface friction determine wheel slip S, which, in turn, determines friction coefficient μ.

ABS control system 40 may be implemented in a digital processor (e.g., a dedicated microcontroller or special purpose computer or even a software partition in a general purpose computer). A signal conditioning module 42 processes a measurement of angular wheel speed ω of each braked wheel generated by a wheel speed sensor 12 to filter out noise and insure the wheel speed signal (which is electrical) is properly converted to a digital sample for use by the digital processor. The processed measurement of angular wheel speed w is applied as the input to the SMO 10 of the ABS control system 40 that generates the estimated differential wheel torque $\delta T_{be}$ in the manner described above.

The estimated differential wheel torque $\delta T_{be}$ output from the SMO 10 is applied to an extrema detector 44 that detects extrema of the estimated differential wheel torque $\delta T_{be}$. The detected extrema of estimated differential wheel torque $\delta T_{be}$ are processed in drive logic 46 to generate the actuator control signal $U_a$ (usually an electrical signal). When the brakes are initially engaged, the actuator control signal $U_a$ is in a default brakes "on" state allowing generation of applied brake torque $T_a$. Thereafter, whenever the actuator control signal $U_a$ is in the brakes "on" state and an extremum (a maximum assuming a fast response brake actuator) of estimated differential wheel torque $\delta T_{be}$ is detected, the drive logic 46 changes the state of actuator control signal $U_a$ to command the brake actuator 32 to discontinue or interrupt the actuator pressure $P_a$ to brake cylinder 34, thereby causing the applied brake torque $T_a$ to begin reducing. When the next extremum of estimated differential wheel torque $\delta T_{be}$ is detected, the drive logic 46 changes the state of actuator control signal $U_a$ to command the brake actuator 32 to apply the actuator pressure $P_a$ to brake cylinder 34, thereby causing the applied brake torque $T_a$ to begin increasing. The time varying applied torque $T_a$ causes the friction coefficient μ to oscillate with the applied brake torque $T_a$ although its mean value will remain very near to the peak friction coefficient $\mu_p$. This ABS braking process corresponds to the process described above with respect to FIGS. 1(b) and 1(c) and as illustrated in the flowchart of FIG. 4.

Although FIG. 3 depicts an SMO based ABS for only a single wheel 60, it will be understood that most components of FIG. 3 will be repeated for each braked wheel. For example, there must be a separate brake actuator 32 and wheel speed sensor 12 for each braked wheel 60. Although there need only be a single microprocessor or digital computer in a preferred embodiment, there may be a separate controller 28 for each braked wheel 60.

Figure 4:
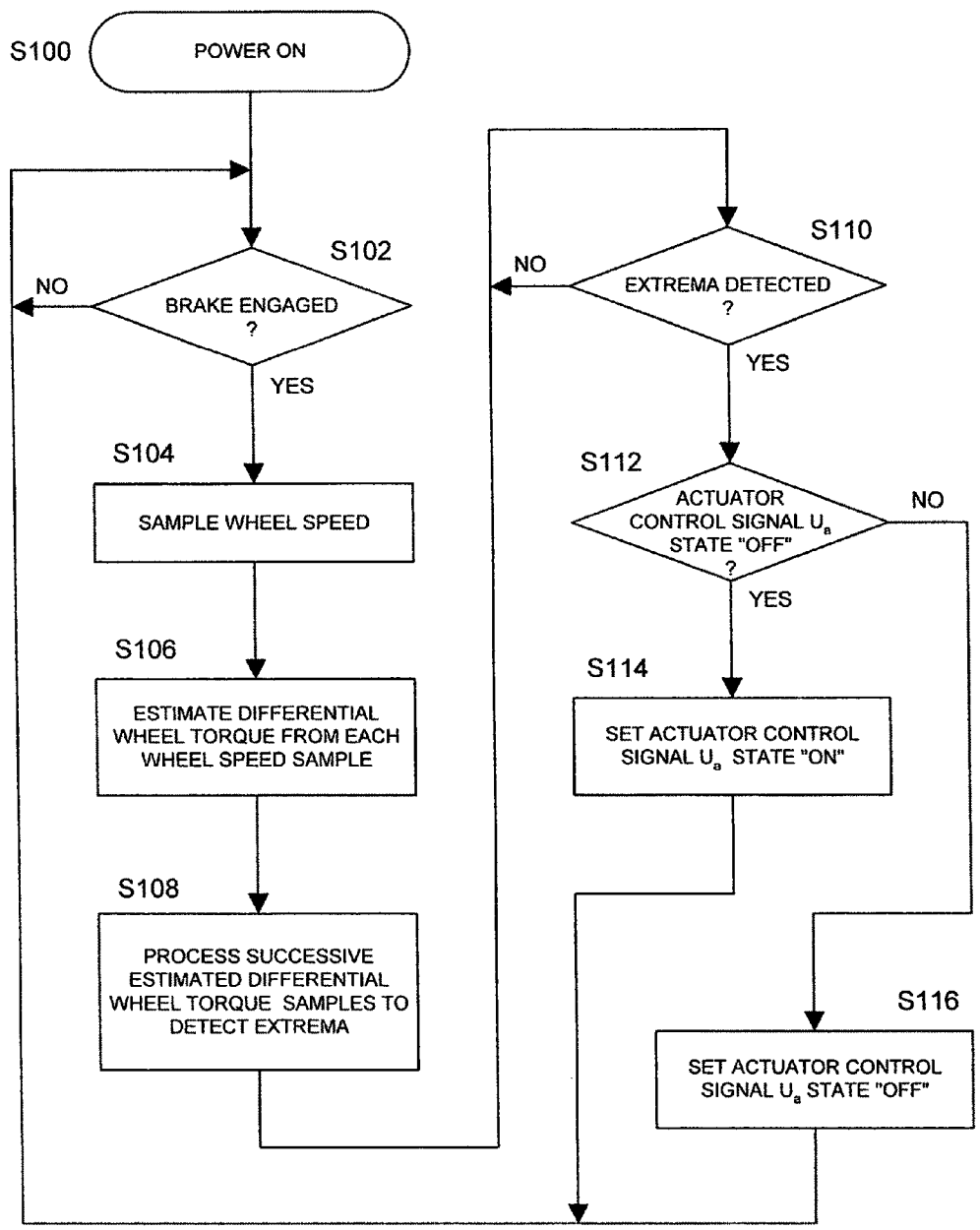
FIG. 4 is a flow chart depicting steps of generating a brake actuator control signal from wheel speed in accordance with a preferred embodiment of the invention.

Turning to FIG. 4, exemplary operating steps for generating and using the actuator control signal $U_a$ during the application of the vehicle brakes by the pilot/driver in steps S100 and S102 are illustrated. Whenever the ABS control system 40 is active, i.e., under braking conditions with a skid condition (or an incipient skid condition), the ABS controller 28 regulates applied brake torque $T_a$ to achieve peak friction coefficient $\mu_p$ during braking conditions in which a skid would otherwise occur. As described above, the applied brake torque $T_a$ is interrupted when the brakes are being applied and an extrema in the estimated differential wheel torque $\delta T_{be}$ generated by SMO 10 is detected by the extrema detector 44 of FIG. 3. Steps S100 and S102 reflect the status of the pilot/driver engaging the brake mechanism or pedal 38.

When the brakes are first engaged, the actuator control signal $U_a$ is in the "on" state allowing generation of applied brake torque $T_a$. In step S104, the wheel speed signal ω is sampled, and the estimated differential wheel torque $\delta T_{be}$ is output from the SMO 10 in step S106 to the extrema detector 44 that detects extrema of the estimated differential wheel torque $\delta T_{be}$ in step S110. When an extrema is detected in step S110, the drive logic 46 determines the state of the actuator control signal $U_a$ in step S112. Whenever the actuator control signal $U_a$ is in the "on" state allowing generation of applied brake torque $T_a$ and an extremum of estimated differential wheel torque $\delta T_{be}$ is detected in step S110, the drive logic 46 switches the actuator control signal $U_a$ to the "off" state in step S118. The brake actuator 32 is commanded by the "off" state of actuator control signal $U_a$ to discontinue or interrupt the actuator pressure $P_a$ to brake cylinder 34, thereby causing the applied brake torque $T_a$ to begin reducing. As explained above, when the next extremum of estimated differential wheel torque $\delta T_{be}$ is detected, the actuator control signal $U_a$ is in the "off" state that is determined in step S114. Drive logic 46 therefore resets the state of actuator control signal $U_a$ to the "on" state in step S116 to command the brake actuator 32 to apply the actuator pressure $P_a$ to brake cylinder 34, thereby causing the applied brake torque $T_a$ to begin increasing. The time varying applied torque $T_a$ causes the friction coefficient μ to oscillate with the applied brake torque $T_a$ although its mean value will remain very near to the peak friction coefficient $\mu_p$.

The logic 46 also contains appropriate logic, to be discussed later, for detecting a deep skid as a safety backup and for changing the actuator control signal $U_a$ to release the brakes in that event, regardless of the output of the extrema detector 44. A system and logic used to implement this safety feature will be described later.

Figure 5:
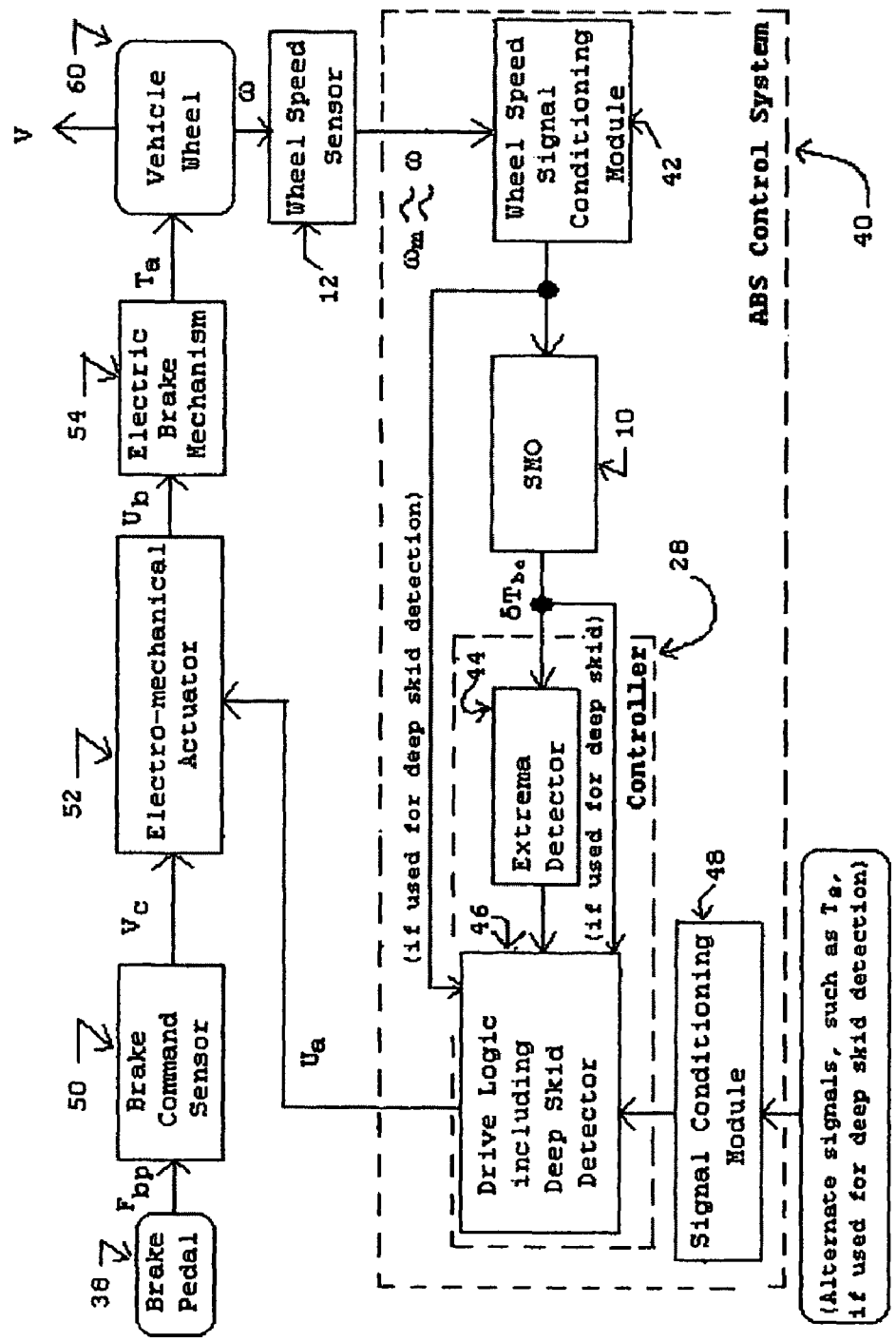
FIG. 5 is a block diagram of a preferred embodiment of the invention for an SMO-based ABS using a switched or proportional electromechanical actuator.

An alternate preferred embodiment for an ABS is depicted in FIG. 5 and is based upon a switched electromechanical braking system instead of a switched electrohydraulic braking system. In this embodiment, the applied brake torque $T_a$ is applied to an electric motor driven wheel caliper system that engages a brake disk, for example, of each braked wheel 60. In addition, a brake command sensor 50 is provided to detect when the pilot/driver depresses or engages the brake mechanism, e.g., a brake pedal 38. The level of braking applied by the pilot/driver to the brake pedal 38 is measured by the brake command sensor 50 as brake command signal $V_c$, which has an amplitude proportional to the applied brake pedal force, $F_{bp}$. This "brake by wire" signal $V_c$ is transmitted to an electro-mechanical brake actuator 52 for each braked wheel 60.

The applied brake torque $T_a$ is generated by the electric brake mechanism 54 in response to the electrical braking signal $U_b$ of the electromechanical brake actuator 52. The electrical braking signal $U_b$ (typically a current) is a combination (for example a direct product of the two signals) of the actuator control signal $U_a$ generated by the controller 28 in the manner described above with respect to FIG. 3 and applied to the brake actuator 52 and the brake pedal force signal $V_c$ output by the brake command sensor 50. The electrical braking signal $U_b$ is applied to the electric brake mechanism 54, which responds by generating the applied brake torque $T_a$ that is applied to the braked wheel 60. This applied brake torque $T_a$ creates the slip S that is responsible for the braking force that decelerates the aircraft/vehicle.

The so-called "electric brake" ABS illustrated in FIG. 5 also employs an ABS control system 40 incorporating an SMO 10 for providing an estimated differential wheel torque $\delta T_{be}$ from the measured wheel speed ω. A wheel speed sensor (on each braked wheel) measures wheel speed ω that is conditioned in wheel speed signal conditioning module 42 and applied to the input of the SMO 10 that estimates the differential wheel torque $\delta T_{be}$.

The extrema (maximums assuming a high bandwidth brake actuator) of estimated, differential wheel torque $\delta T_{be}$ are detected in extrema detector 44 and toggle the state of control signal $U_a$ output by the drive logic 46 in the manner described above with respect to FIGS. 3 and 4. The state of the control signal $U_a$ causes the electromechanical brake actuator 52 to either generate the electrical braking signal $U_b$ to the brake mechanism 54 or halt the generation of the electrical braking signal $U_b$ to effect ABS operation as described above. Without loss of generality, the brake actuator dynamics do not have to be considered in this simplified embodiment of the invention. Note that with a "slow" brake actuator, some of the actuator control signal command changes may occur at relative minimums of the estimated differential wheel torque $\delta T_{be}$.

Whenever a peak friction coefficient $\mu_p$ has been detected during braking (i.e. when Ta>0), the binary value actuator control signal $U_a$ will have a value that causes applied braking torque $T_a$ to decrease rapidly to zero with respect to the time for slip to increase significantly from its optimum value, $S_o$, at the time brakes were turned "off". On the other hand, whenever a peak friction coefficient $\mu_p$ has been detected with $T_a$ previously reduced to zero, the actuator control signal $U_a$ will switch to turn the brakes "on" and cause applied braking torque $T_a$ to rapidly increase. The friction coefficient μ will oscillate with applied braking torque $T_a$ to maintain the friction coefficient μ near the maximum value.

As with the electrohydraulic brake actuator described with respect to FIG. 3, drive logic 46 of FIG. 5 also detects a deep skid if present and reduces the electromechanical brake actuator control signal $U_a$ to the brakes "off" level. Normal braking control operation is based upon detecting relative extrema in the differential torque in the same way as explained above for the electrohydraulic brake actuator-based embodiment of FIG. 3.

There are many methods for detecting extrema in time varying variables that may be implemented in relative extrema detector 44. One exemplary such method of detecting relative extrema (maxima with the sign conventions adopted here) in the estimated differential wheel torque $\delta T_{be}$ used in a preferred embodiment involves generating a time-delayed differential wheel torque $\Delta T_{be}(\tau)$ as the change in estimated differential torque $\delta T_{be}$ between time t−τ and the current time t. This is essentially taking the time derivative of the differential wheel torque estimate. It is well known that an extreme of a function of a single variable occurs when the first derivative is equal to zero. We shall use this principle in our preferred embodiments for detecting extrema. Time-delayed differential wheel torque $\Delta T_{be}(t)$ is proportional to this time derivative where:

$$\Delta T_{be}(t) = \delta T_{be}(t) - \delta T_{be}(t-\tau_1), \qquad (9)$$

where $\tau_1$=time delay (which might be ~25 msec for a light aircraft or car).

Figure 6:
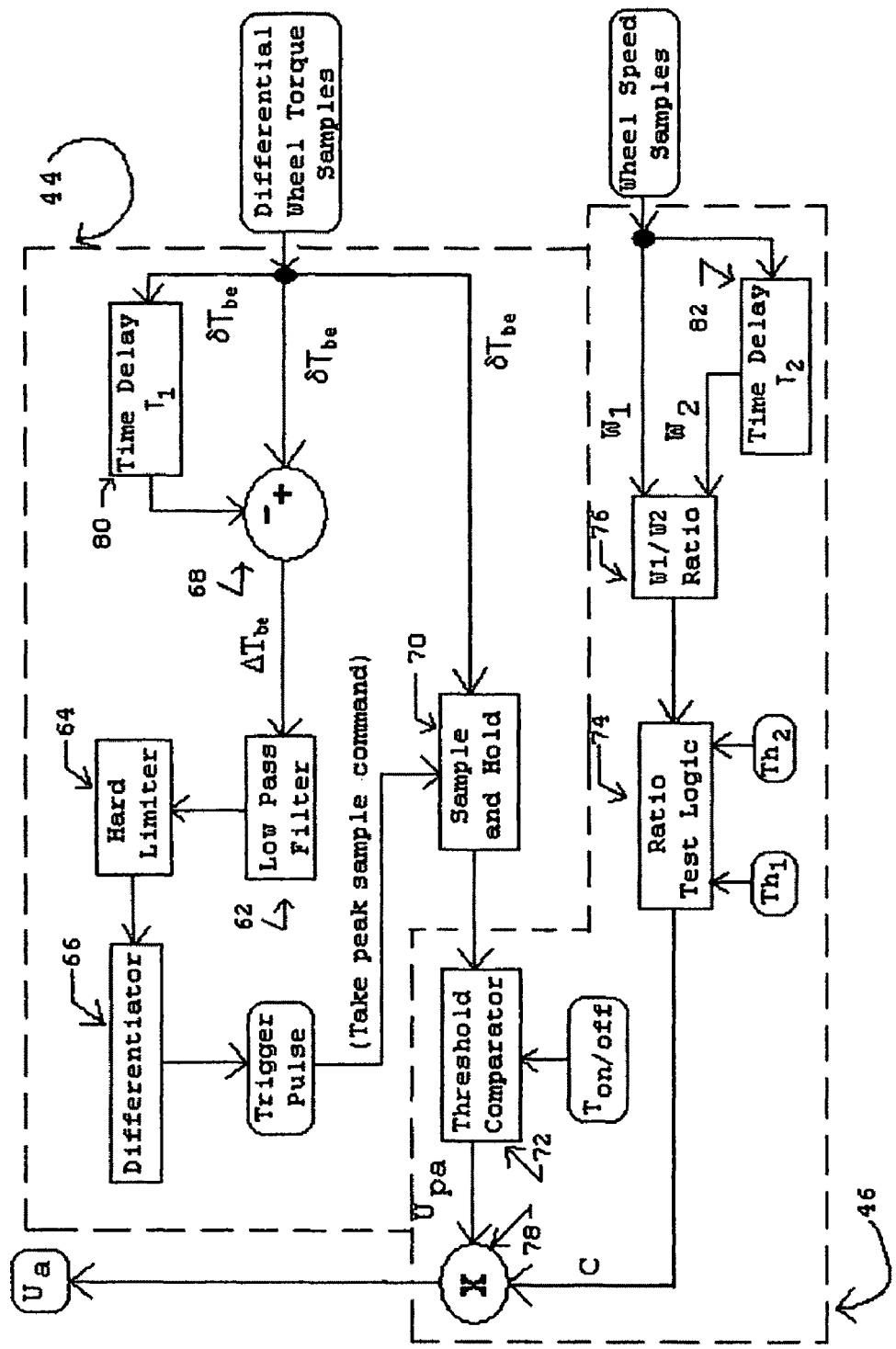
FIG. 6 is a block diagram of a preferred embodiment of a controller suitable for use in the SMO based ABS control systems of FIG. 3, 4 or 5.

Turning to FIG. 6, it depicts one exemplary implementation of the peak detection and drive logic and deep skid detection functions of controller 28 for either a switched or proportional electrohydraulic or electromechanical brake actuator. Alternative and equivalent implementations will be apparent to persons skilled in the art.

Referring first to the embodiment of the extrema detector 44 depicted in FIG. 6, successive estimated differential wheel torque $\delta T_{be}$ samples are time-delayed in block 80, and each time delayed sample $\delta T_{be}(t-\tau_1)$ is subtracted in block 68 from a current sample $\delta T_{be}(t)$ to develop the differential torque $\Delta T_{be}(t)$ of equation (9). The differential torque $\Delta T_{be}(t)$ samples are then filtered by low pass filter 62 to remove high frequency noise and hard limited in amplitude by hard limiter 64 to, for example, ±1 corresponding to $\Delta T_{be}(t)$ being positive or negative. The hard limited amplitude signal is essentially the sign of the time derivative of differential wheel torque, and the sign changes at the extreme values of estimated differential torque $\delta T_{be}$. The limited amplitude signal is differentiated again by differentiator circuit 66 to yield a pulse-like trigger signal occurring right at the extremum of estimated differential torque $\delta T_{be}$. This trigger signal is applied to a sample and hold circuit 70 that receives each estimated differential wheel torque sample $\delta T_{be}$ at an input terminal but only presents the one selected by the trigger signal at its output terminal The sample and hold circuit 70 holds the value of the estimated differential torque $\delta T_{be}$ input to it each time that a trigger signal is generated. This sampled and held value of the estimated differential torque $\delta T_{be}$ at its Nth successive extremum, t=$t_N$, may be denoted as $\delta T_{be}(t_N)$. The sample $\delta T_{be}(t_N)$ is used to create a primary actuator control signal $U_{pa}(t)$ that operates the brake actuator 32 or 52 between the successive times $t_N$ and $t_{N+1}$ that extrema are detected of the same type (maxima for the conventions adopted here). The sampled and held value $\delta T_{be}(t_N)$ is compared with a brakes on/off threshold level, $T_{on/off}$ (e.g., 0.5) in comparator 72 to develop the primary actuator control signal $U_{pa}$.

The deep skid detector optionally incorporated into the drive logic 46 of controller 28 is described in more detail later, but it involves computing the difference of successive wheel speed measurements and comparing them to appropriate thresholds in logic block 74 to generate a (binary) secondary actuator control signal C that is 0 in a deep skid and is 1 (unity) otherwise. The product of secondary actuator control signal C and primary actuator control signal $U_{pa}$ determined in multiplier 78 results in the actual control signal $U_a$. If the deep skid detector is not implemented in an ABS control system of the present invention or is not operating or operational or is 1 (no deep skid condition), then the primary actuator control signal $U_p(t)$ passes through the multiplier 78 and comprises the actuator control signal $U_a$. If the secondary actuator control signal C is 0 (deep skid condition), then the state of actuator control signal $U_a$ is 0, and the brakes are set to "off". The actuator control signal $U_a$ is applied to the brake actuator, e.g., the brake actuators 32 and 52 of FIG. 3 and 5 that modulates or regulates braking as described above and with respect to FIG. 4.

The brakes on/off threshold $T_{on/off}$ applied to threshold comparator 72 may correspond to a level of estimated differential wheel torque $\delta T_{be}$ lying between the peak differential wheel torques occurring with brakes commanded "on" and with brakes commanded "off". Whenever the sample value $\delta T_{be}(t_N)$ exceeds $T_{on/off}$, the primary actuator control signal $U_{pa}$ (acting as actuator control signal $U_a$) switches the brakes "on" causing $T_a$ to increase rapidly. Whenever the sample value $\delta T_{be}(t_N)$ is less than the threshold, $T_{on/off}$, the primary actuator control signal $U_{pa}$ switches the brakes "off" causing $T_a$ to decrease rapidly. The value selected for threshold $T_{on/off}$ can be determined via computer simulation for a particular choice of brake actuator. It is also possible to have $T_{on/off}$ adjust to dynamically changing ground surface conditions in a more sophisticated embodiment.

It should be noted, that the peak detector 44 described above with respect to FIG. 6 is just one possible realization of a peak detector that may be employed in the practice of the present invention. There are many other methods of determining the exact time a given digital signal reaches a peak value and these are all intended to be included in this invention.

Referring again to FIG. 3, operation of the ABS control system 40 employing the controller embodiment of FIG. 6 with a switched electrohydraulic brake actuator 32 is such that the actuator control signal $U_a$ causes the hydraulic pressure $P_a$ in brake cylinder 34 to increase towards its maximum value or decrease towards zero depending on the state of the actuator control signal $U_a$. Similarly, in the case of a switched electromechanical brake actuator 52 in the embodiment of FIG. 5, the electrical braking signal $U_b$ is switched "on" or "off" to increase or decrease the applied brake torque $T_a$ as a function of the state of the actuator control signal $U_a$. Operation of the ABS control system 40 employing the controller embodiment of FIG. 6 with a proportional electrohydraulic or electromechanical brake actuators is very similar. In the latter case, the brake controller 28 must provide a switched component in the actuator control signal $U_a$ to the proportional brake actuator to increase or decrease the applied brake torque $T_a$. The details of the controller logic to provide the switched component would be similar to that for a switched brake actuator and are well known to those skilled in the art.

A number of assumptions have been made to this point, simply for ease of explaining aspects of the invention, that are not necessary to practice the invention. For example, it is not necessary for the applied brake torque $T_a$ levels corresponding to brakes "on" and brakes "off" to remain constant over time, i.e. brake fade is allowed. Moreover, it is not necessary for the tire load N to remain strictly constant, i.e. vertical dynamics of the aircraft are allowed as it proceeds with the landing roll. These forces should only be relatively slowly varying relative to wheel dynamics during a single cycle of ABS operation (e.g., typically 200-400 msec). Furthermore, as already noted, it is not necessary to assume that the brakes switch instantly between the brakes "on" and "off" states. The major effect on ABS operation of a finite bandwidth brake actuator is a slight delay in the detection of the relative maximum of friction coefficient μ compared to the occurrence of the extremum of actual differential wheel torque $\delta T_b$. Simulation studies of the invention demonstrate that the invention works successfully with finite brake switching times equivalent to a first order time constant of 15-50 msec, which is typical, for example, of an automotive brake pressure modulator, a type of switched electrohydraulic brake actuator. Proportional brake actuators need be no slower than switched brake actuators in responding to the switched component present in the actual control signal $U_a$.

As a representative example of the braking performance expected from a preferred embodiment, a MATLAB/SIMULINK simulation model for an ABS based upon the present invention was conducted. It assumed a switched electrohydraulic brake actuator and followed the block diagram shown in FIG. 3. The switched brake actuator in this model was modeled as a combination of a threshold controlled switch and second order transfer function with a natural frequency ($\omega_N$) of about 100 rad/sec and a damping ratio of about 0.7.

Figure 7A:
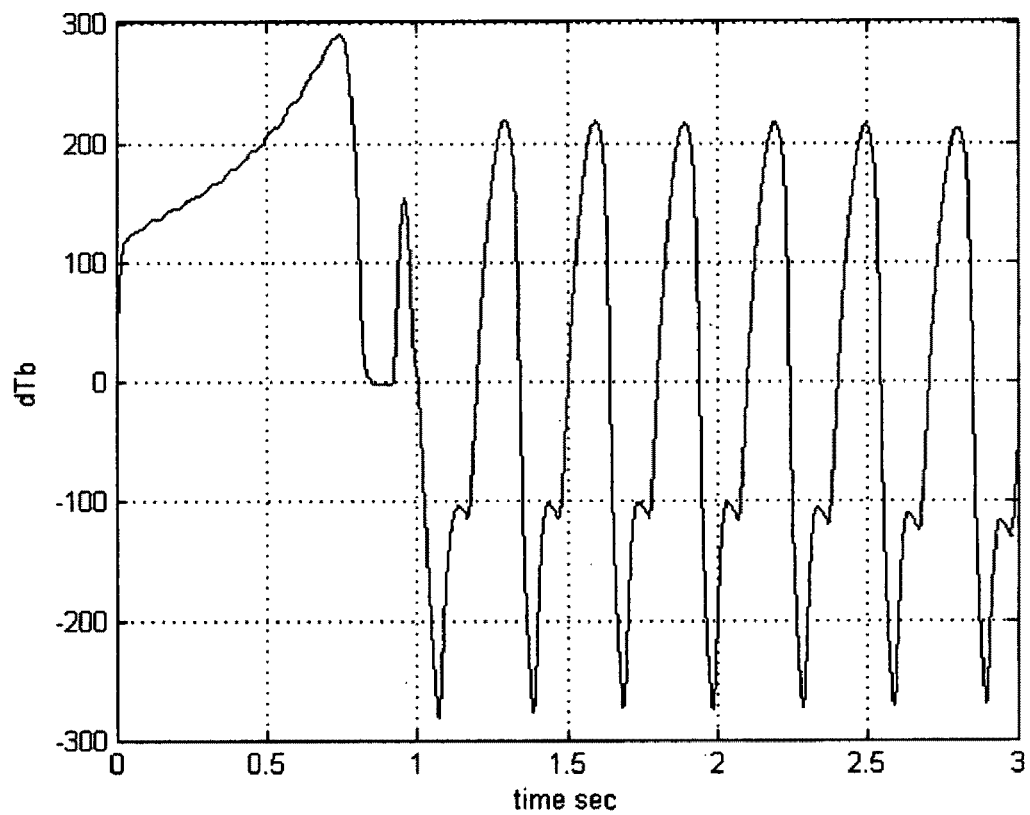
FIGS. 7(a)-7(d) are a set of plots showing (true) differential wheel torque, the SMO estimated differential wheel torque, the applied brake torque overlaid on the estimated differential wheel torque, and the friction coefficient μ and peak friction coefficient $\mu_p$ vs. time in a simulated landing roll on dry loose snow.
Figure 7B:
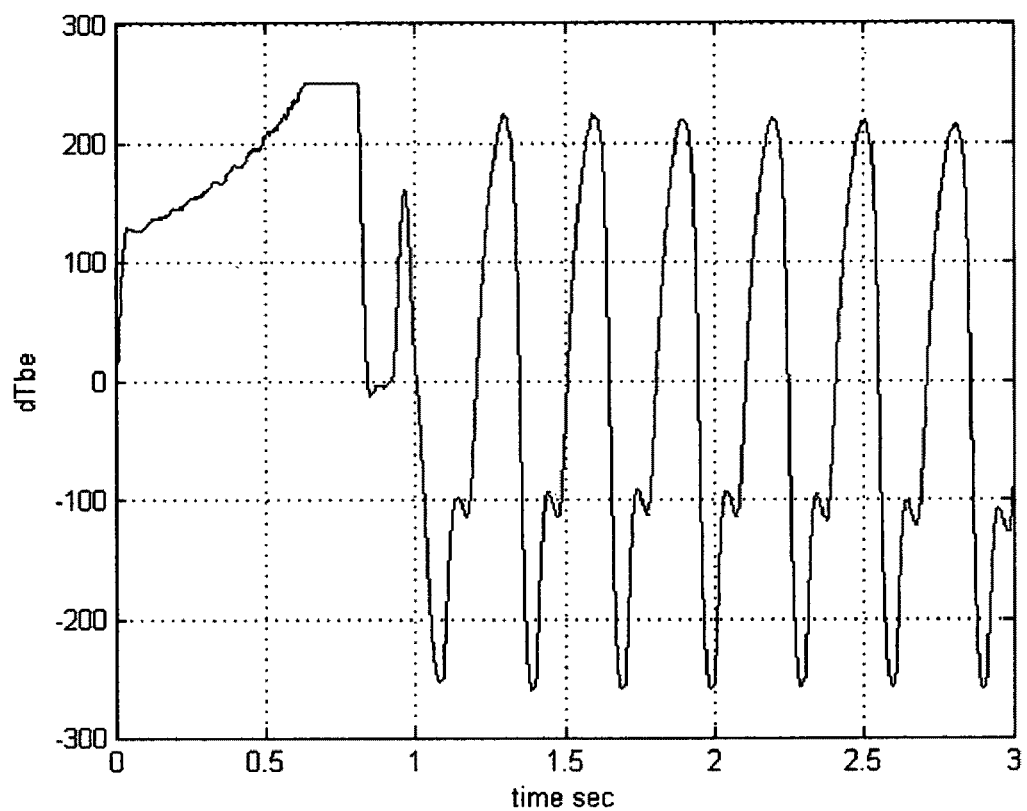
Figure 7C:
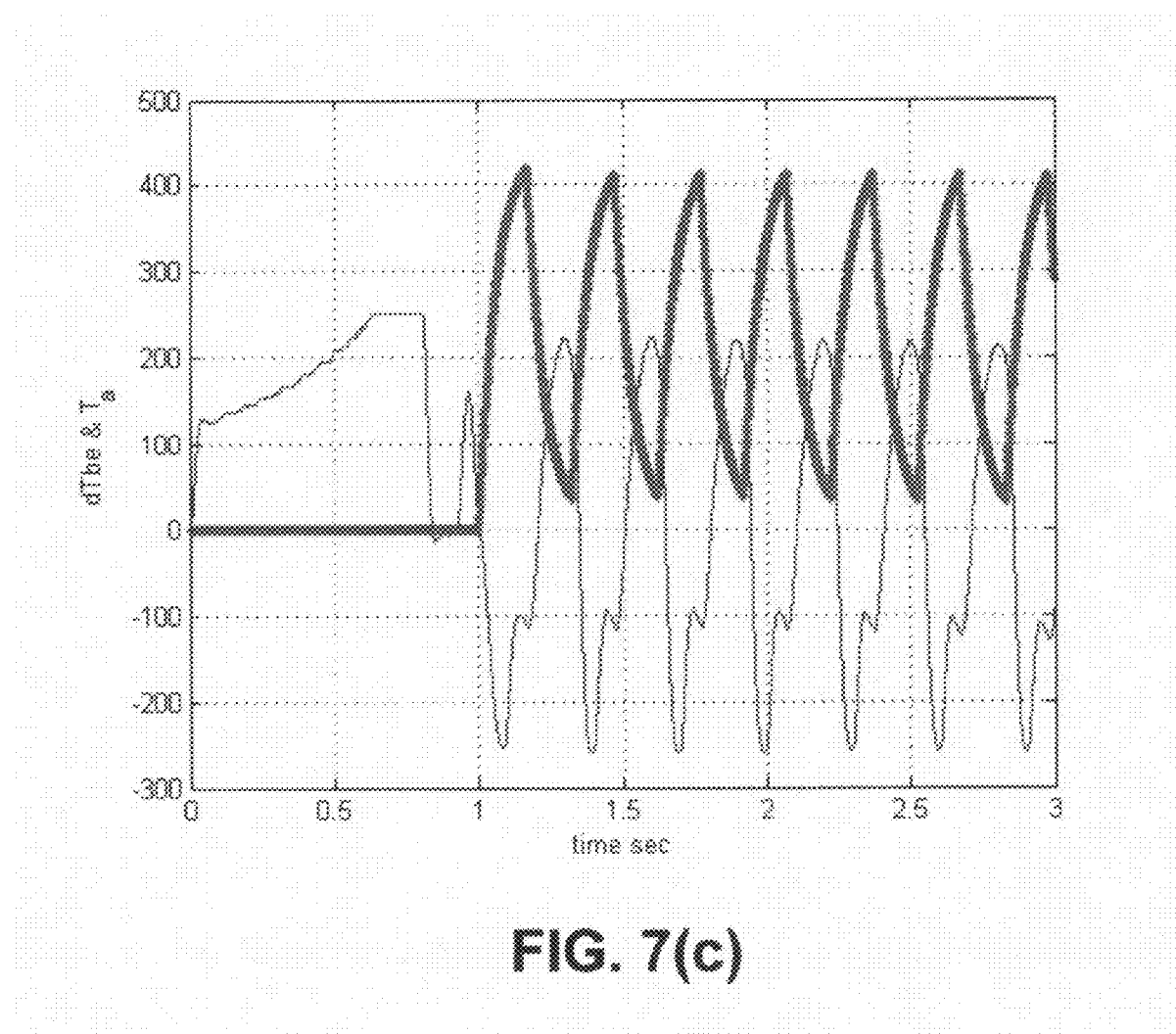
Figure 7D:
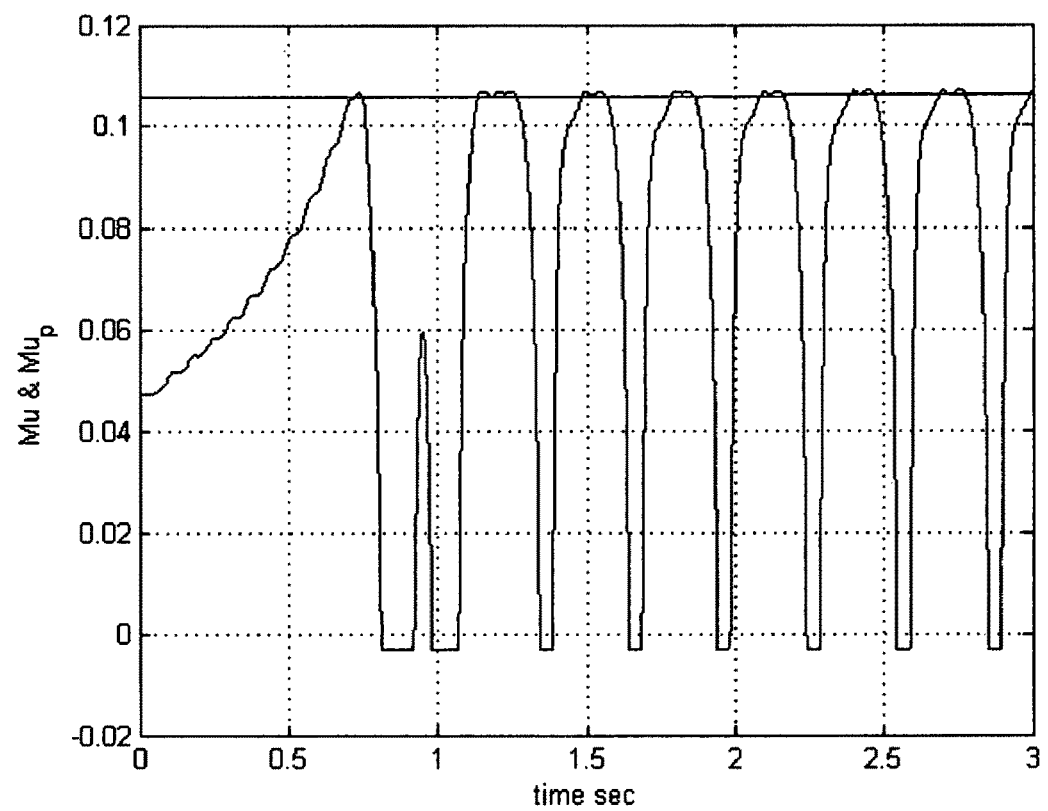

Results of the simulation are plotted in FIGS. 7(a)-7(d) assuming a snow covered runway surface with a peak friction coefficient up of 0.113 at the start of the landing roll and an optimal (but unknown to the SMO based ABS) slip $S_o$ of 0.135. FIG. 7(a) is a plot of true differential wheel torque $\delta T_b$ vs. time for the first 3 seconds of the landing roll. The SMO based ABS is not turned on until about 1 second into the landing roll to allow the wheels time to spin-up. FIG. 7(b) is a plot of the SMO estimate of differential wheel torque $\delta T_{be}$ vs. time over this same period and clearly tracks the true value closely, almost exactly after the initial landing transient. FIG. 7(c) is an overlay of the applied brake torque $T_b$ (the broad line) on the SMO estimate of differential wheel torque $\delta T_{be}$ vs. time. Note that the brakes reverse at or very close to the relative maxima (here maximums) in $\delta T_{be}$. Finally, FIG. 7(d) is a plot of μ vs. time with $\mu_p$=0.113 (dry loose snow) at the start of the landing roll and $S_o$=0.135. These plots may be considered as "proof of concept" results and can easily be improved by adjustments of the extrema threshold $T_{on/off}$.

The above description of ABS operation is for the normal situation in which the ABS cycles back and forth around the optimum slip $S_o$. In this case, relative extrema of actual differential wheel torque $\delta T_b$ occur each time the slip S crosses the optimum value either increasing (i.e., with brakes "on") or decreasing (i.e., with brakes "off"). In this normal operation, the brake actuator 14 "toggles" between the "on" state and the "off" state.

In the following, a number of ways are set forth for detecting an undesirable excessive slip condition at the interface of the tire and the ground surface, e.g., a deep skid, and for changing the state of the actuator control signal $U_a$ to the second state (e.g., a mathematical 0 value) during detection of the undesirable slip condition. The brake actuator 32 or 52 is thereby commanded to turn braking "off" and the applied brake torque $T_a$ is discontinued for the duration of the undesirable slip condition even if the pilot/driver continues to apply the brakes.

Occasionally an exogenous input to the wheel dynamics (e.g., due to relatively severe runway or road surface unevenness or bumps) can cause an extraneous relative extrema of actual differential wheel torque $\delta T_b$. Other unusual conditions can result in an occasional undetected relative extrema of actual differential wheel torque $\delta T_b$. Either circumstance can disrupt the normal brake control resulting in either wheel lock (i.e., slip→1) or brake off (i.e., slip→0). While an insufficient slip due to prolonged brake "off" can easily be detected and corrected by various ad-hoc techniques that a person of reasonable skill in the art could devise, a wheel lock situation can present a real danger and must not be allowed to develop even for an instant.

In accordance with the present invention, a deep skid that could result in a wheel lock condition can be detected using signals readily available to the ABS control system 40. In the preferred embodiment depicted in FIG. 6, the deep skid condition can then be corrected by combining the primary actuator control signal $U_{pa}$ with the secondary actuator control signal C, which can be generated in various ways described below, in order to release the brakes. In preferred embodiments for deep skid detection, the conditions leading to incipient wheel lock (e.g., owing to a missed extremum of estimated differential wheel torque $\delta T_{be}$) can be detected based upon wheel angular speed changes alone.

In one preferred embodiment, a first wheel speed ratio of a current wheel speed measurement to a time-delayed wheel speed measurement is calculated. A second wheel speed ratio equal to unity minus the first wheel speed ratio and equivalent to the subtracting the current wheel speed measurement from the delayed wheel speed measurement and dividing this quantity by the delayed wheel speed measurement is calculated. The second wheel speed ratio is compared to an upper threshold indicative of an excessive slip condition and a lower threshold indicative of an acceptable slip condition to derive a secondary actuator control signal C.

As described above with reference to FIG. 6, the actuator control signal $U_a$ is the product of a primary actuator control signal $U_{pa}$, which operates as the actuator control signal $U_a$ applied to the brake actuator 32 or 52 under the condition of an acceptable slip, and the secondary actuator control signal C. The secondary actuator control signal C has an initial default value of unity and is set to zero whenever the second wheel speed ratio exceeds the upper threshold and is reset to unity whenever the second wheel speed ratio falls below the lower threshold. When the secondary actuator control signal C is zero, the product of the primary actuator control signal $U_{pa}$ and the secondary actuator control signal C (i.e., the state of the actuator control signal $U_a$) is set to the second state or zero, and braking is disabled or interrupted as long as the secondary actuator control signal C persists.

A pair of wheel speed samples $w_1$ and $w_2$ of wheel speed ω can be used to generate the first wheel speed ratio R in the $w_1/w_2$ wheel speed ratio calculator 76 according to:

$$R = w_1/w_2, \quad (10)$$

where $w_1$=present wheel speed signal sample, and $w_2$=time delayed wheel speed signal sample.

The pairs of wheel speed signal samples may be obtained directly from the wheel speed ω output by wheel speed sensor 12 and conditioned by the wheel speed signal conditioner 42 as shown in FIGS. 3 and 5. The wheel speed signal samples may be separated in time by a time delay $\tau_2$, where $\tau_2$ is in the range of 25 to 100 msec depending upon the dynamic of the wheel/brake system, effected by time delay $T_2$ block 82 in FIG. 6. Optimization of the ABS performance may be achieved by additional filtering of the wheel speed measurements.

The secondary actuator control signal C in FIG. 6 for this preferred embodiment is generated in the ratio test logic 74 and is given as:

| | |
|---|---|
| C = 0 | R1 ≧ $Th_1$ |
| C = 1 | R1 < $Th_2$ | (11)

where R1=1−R is a second wheel speed ratio, $Th_1$ is an upper threshold indicative of an excessive slip condition, and $Th_2$ is a lower threshold indicative of an acceptable slip condition. The values of the two thresholds $Th_1$ and $Th_2$ are determined by the wheel/brake dynamics of a particular vehicle. Typical values of these thresholds for light aircraft may be about $Th_1$=0.2; $Th_2$=0, depending upon wheel dynamics. There is no change in secondary actuator control signal C for $Th_2 < r_1 < Th_1$. The use of two thresholds $Th_1$ and $Th_2$ rather than a single threshold allows for adding hysteresis in the generation of secondary actuator control signal C to prevent chattering between its two values 1 and 0. In FIG. 6, the present wheel speed sample is divided by a sample that is delayed by time delay $T_2$ in the ratio block 76, which calculates wheel speed ratio R according to equation (10). The second wheel speed ratio R1 is compared it to the upper and lower thresholds $Th_1$ and $Th_2$ in ratio test logic 74 resulting in the secondary actuator control signal C having a value of 1 or 0 as indicated in (11) above. In multiplier 78, the primary actuator control signal $U_{pa}$ is multiplied by the secondary actuator control signal C generated from wheel speed ratio R1 in accordance with the equations (10) and (11) above. The final actuator control signal $U_a$ output by multiplier 78 is the product:

$$U_a = U_{pa}C. \quad (12)$$

During normal ABS operation (i.e., no erroneous extremum detection), the secondary actuator control signal C=1, and the primary actuator control signal $U_{pa}$ is passed to the brake actuator as the brake control signal $U_a$. However, in the event of an erroneous extremum detection leading to incipient wheel lock condition, secondary actuator control signal C=0, and the state of actuator control signal $U_a$ is set to 0, whereby the brakes are set to "off" by the brake actuator.

In passing, note that a simple variation of the preferred embodiment for detecting a deep skid, owing to a missed extremum of estimated differential wheel torque $\delta T_{be}$, can be obtained from the wheel angular speed samples ω by directly computing a deceleration estimate:

$$a(k) = [\omega(k) - \omega(k-1)]/T_s, \quad (13)$$

where a(k)=deceleration estimate, ω(k), ω(k−1)=two successive samples of wheel speed signal, and $T_s$=time difference between the samples.

Again, this time difference may be in the range of 25 to 100 msec depending on the wheel/brake system dynamics. The deceleration estimate a(k) can also be compared with a threshold to generate a secondary actuator control signal C. The deceleration estimate a(k) has priority over the primary actuator control signal $U_{pa}$ generated from the extrema of estimated differential wheel torque $\delta T_{be}$ for causing the brakes to reduce the applied torque. The secondary actuator control signal C is generated from:

| | |
|---|---|
| C = 0 | a(k) < $Th_a$ |
| C = 1 | a(k) ≧ $Th_a$, | (14)

where $Th_a$ is an acceleration threshold.

Again, the actuator control signal $U_a$ is the product of the primary actuator control signal $U_{pa}$ and the secondary actuator control signal C. The amount of reduction in applied brake torque $T_a$ is a function of the dynamics of the wheel and brake system. The above described two embodiments for deep skid detection and correction simply reuse the same wheel speed samples w employed by the SMO 10 to estimate the differential wheel torque and are quite attractive from that point of view. Other wheel speed measurement based techniques may occur to a person of skill in the art and all are considered candidates for inclusion in the deep skid detection logic incorporated into drive logic 46.

However, there are many additional techniques for deep skid detection that do require the presence of other inputs to the ABS control system 40 that may be used in alternate embodiments of the deep skid detection logic included in drive logic 46. Basically, these all provide a rough estimate $S_e$ of slip S as in the '041 patent. However, unlike the uses set forth in the '041 patent, deep skid detection is the only use for the rough slip estimate $S_e$.

Although the actual ground/tire peak friction coefficient $\mu_p$ is not known, it is possible to assume a maximum allowed value of friction coefficient $\mu$ for slip S as $S_{max}$, for safety purposes, which might be an $S_{max}$ of 0.3, for example. Whenever estimated slip $S_e$ exceeds this threshold $S_{max}$ for an impending deep skid, it can be concluded that the controller 28 has not detected the passing of optimal slip $S_o$. Again, a (binary) secondary actuator control signal C can be generated in block 46 at the instant estimated slip $S_e$ crosses $S_{max}$ (while increasing). This secondary actuator control signal C multiplies the primary actuator control signal $U_{pa}$ as per equation (12) causing the brake control signal $U_a$ to change to "0" and the brake actuator to switch off, releasing the brakes. Normal control is returned at the instant the next extremum of estimated differential wheel torque $\delta T_{be}$ is detected. This statement holds regardless of the type of brake actuator, electromechanical or electrohydraulic and switched or proportional.

It also is possible that an extremum value of estimated differential wheel torque $\delta T_{be}$ is not detected as slip S decreases. This situation can also be detected using the slip estimate $S_e$. When the estimated slip $S_e$ crosses a lower threshold, $S_{min}$, (which might be 0.1, for example) while decreasing and while the brakes are not applied by the pilot/driver, this can be taken as an indication that an extremum of estimated differential wheel torque $\delta T_{be}$ was not detected. A trigger signal identifying this missed detection can be generated when estimated slip $S_e$ decreases below the lower threshold $S_{min}$ while brakes are not being applied by the pilot/driver. This trigger signal is sent to logic circuitry 46 that switches the brake actuator 32 or 52 on, thereby applying the braking torque $T_a$ to the wheel.

The following is a third embodiment for detecting a deep skid that attempts to directly compute $S_e$ and compare it to $S_{max}$ above and could be incorporated into the logic in block 46. Once the condition $S_e > S_{max}$ is detected, the same secondary actuator control signal C (used in the wheel speed only embodiments described above) can be used to force the actuator control signal $U_a$ to the "off" level. In particular, the SMO estimate of differential wheel torque $\delta T_{be}$ can also be used in block 46 to estimate the braking force $F_b$ that acts to decelerate the aircraft/vehicle. Denoting the estimate of braking force $F_{be}$, it can be seen that this quantity is given by:

$$F_{be} = \frac{1}{r}(\delta T_{be} - T_a). \tag{15}$$

The applied brake torque $T_a$ can, in principle, be measured or estimated using suitable instrumentation. In the case of an electromechanical brake, applied brake torque $T_a$ is roughly proportional to brake actuator electric current signal $U_b$. An external brake torque sensor can measure this current and convert it to an estimate $T_{ae}$ of $T_a$, which can then be conditioned in signal conditioning module 48 to remove noise and input to the drive logic block 46 shown in FIG. 5. Usually, such a torque estimate would not be sufficiently accurate for directly maximizing the braking torque obtained by adding the estimated applied brake torque $T_{ae}$ to the estimated differential wheel torque $\delta T_{be}$. But, it is sufficiently accurate for computing a rough estimate of wheel slip $S_e$ for detecting the start/presence of a deep skid.

Similarly, in the case of an electrohydraulic brake actuator and braking system of FIG. 3, it is possible to fairly closely estimate the applied brake torque $T_a$ from measurements of brake pressure $P_a$ and wheel speed $\omega$. Using empirical modeling methods, an estimate of applied brake torque $T_{ae}$ can thus be derived as a function of brake pressure $P_a$ and wheel speed $\omega$ for an electrohydraulic brake actuator yielding $T_{ae}(P_a, \omega)$. A map of this function can be stored in memory of a controller 28 implemented in a digital processor or computer as will be known to a person of skill in the art. Then, during normal operation of the ABS system, an estimate of instantaneous applied brake torque $T_{ae}$ can be generated in the drive logic 46 from measurements of brake pressure $P_a$ and wheel speed $\omega$.

For either electromechanical or electrohydraulic brake actuators, and regardless of whether the brake actuator is a switched or proportional brake actuator, the braking force estimate $F_{be}$ is then given by:

$$F_{be} = \frac{1}{r}(T_{ae} - \delta T_{be}). \tag{16}$$

The braking force estimate $F_{be}$ can then be used to estimate aircraft/vehicle wheel velocity (denoted $V_e$) where V is the actual wheel velocity appearing in FIGS. 3 and 5) according to:

$$M\frac{dV_e}{dt} = (T_e - D_e - F_{re} - F_{be}), \tag{17}$$

where $T_e$=residual engine thrust for an aircraft during the landing roll, $D_e$=estimate of aerodynamic drag, $F_{re}$=estimate of rolling resistance, M=aircraft/vehicle mass=W/g (W=landing weight, g=32.2 ft/sec$^2$), which are all constants.

The residual engine thrust $T_e$ can be assumed to be zero or a small positive value unless thrust reversers are applied, in which case a nominal negative value should be used as residual engine thrust $T_e$. The constants of equation (16) are all determined beforehand or as functions of other signals such as thrust reverser deployment readily available on the aircraft and stored in the on-board ABS microprocessor or computer. Persons of skill in the avionics art will have no problem coming up with alternate ways to estimate the thrust. Of course, residual engine thrust $T_e$ is zero for a land vehicle, as it is assumed the driver does not have his/her foot on both the brake and accelerator at the same time.

The components of this equation are readily estimated for any given aircraft model according to:

$$D_e = \rho C_D S_{ref} V_e^2, \tag{18}$$

where $\rho$=air density, $C_D$=drag coefficient in landing configuration, $S_{ref}$=reference area (well known for the aircraft in question), and $V_e$=airspeed.

The estimate of rolling resistance $F_{re}$ can also be derived from:

$$F_{re} \approx \mu_r W, \quad (19)$$

where $\mu_r$=average tire rolling resistance (for all wheels) and W=landing weight on the aircraft. (Note that wheel load N that was used earlier in computing the wheel braking torque is the part of W that acts on a particular wheel).

The residual engine thrust estimate $T_e$ and tire rolling resistance $\mu_r$ are also known with sufficient accuracy for the purpose of estimating aircraft velocity $V_e$ and hence $S_e$ given the measured wheel speed $\omega$. It should be noted that the two most significant factors in the differential equation for velocity, namely, $T_e$ and $\delta T_{be}$, are known with the greatest accuracy. Consequently, a close estimate of the estimated aircraft velocity $V_e$ is obtained via numerical integration in the controller of:

$$V_e - V_i = \frac{g}{W} \int_{t_o}^{\tau} \left[ T_e - D_e - F_{re} - \frac{1}{r}(T_{ae} - \delta T_{be}) \right] dt, \quad (20)$$

where $V_i$=aircraft/vehicle velocity at the instant brakes are applied.

The aircraft/vehicle velocity $V_i$ is easily derived from the wheel radius r and the measurement of wheel speed $\omega$ at the instant $t_o$ the brakes are applied, since slip S is zero until after the brakes are applied:

$$V_i = r\omega(t_o). \quad (21)$$

The wheel speed derived estimate of initial aircraft/vehicle velocity $V_i$ can then be added to both sides of equation (20) above resulting in the desired estimate $V_e$ of current aircraft velocity V. That along with the current measurement of wheel speed can be used in drive logic 46 of FIG. 3 or 5 to estimate the instantaneous slip. This constitutes a further embodiment of a deep skid detector.

The slip estimate $S_e$ is derived from the following equation where again r is wheel radius and $\omega$ is the measured wheel speed:

$$S_e = \frac{V_e - r \times \omega}{V_e}. \quad (22)$$

Finally, if slip estimate $S_e$ is $>= S_{max}$, then the secondary actuator control signal C in FIG. 6 is set to 0. Otherwise the secondary actuator control signal C is set to 1, and the primary actuator control signal $U_{pa}$ is output from drive logic 46 as brake control signal $U_a$.

The following describes yet a fourth embodiment for generating a suitable slip estimate $S_e$ for deep skid detection. In some aircraft applications, a wheel speed sensor is available on the nose gear that can be used as an alternative to estimating slip via the previous integration. This is a very direct and well-known way to obtain slip estimate $S_e$, and the nose wheel speed could optionally be suitably conditioned in signal conditioner 48 and input to drive logic 46 of FIG. 3 or 5 to compute the slip estimate $S_e$.

Since this nose wheel is unbraked, it has zero slip. Consequently, the vehicle velocity estimate $V_e$ is directly given by:

$$V_e = r_n \omega_n, \quad (23)$$

where the subscript n refers to the nose wheel radius and measured angular velocity.

The nose wheel velocity estimate $V_e$ would be used directly in equation (22) above along with the measured wheel speed to obtain the desired "back-up" or rough slip estimate. It represents yet another embodiment of a deep skid detector, and the associated computations using equations (22) and (23) would take place in drive logic 46 of FIG. 3 or 5. The secondary actuator control signal C would then be generated using the same logic as in all the deep skid detector embodiments described previously.

Finally it must be emphasized that none of the estimates of slip $S_e$, or wheel angular speed ratio changes, or wheel deceleration described in the previous discussion of deep skid detection and correction are used in normal SMO based ABS operation. However, they can be used for cases in which control based upon extrema of estimated differential wheel torque $\delta T_{be}$ does not detect that slip S has well exceeded its optimal value $S_o$.

All patents and publications referenced herein are hereby incorporated by reference in their entireties.

It will be understood that certain of the above-described structures, functions and operations of the above-described preferred embodiments are not necessary to practice the present invention and are included in the description simply for completeness of an exemplary embodiment or embodiments. It will also be understood that there may be other structures, functions and operations ancillary to the typical surgical procedures that are not disclosed and are not necessary to the practice of the present invention.

In addition, it will be understood that specifically described structures, functions and operations set forth in the above-referenced patents can be practiced in conjunction with the present invention, but they are not essential to its practice.

It is therefore to be understood, that within the scope of the appended claims, the invention may be practiced otherwise than as specifically described without actually departing from the spirit and scope of the present invention.

The invention claimed is:

1. An antilock braking system (ABS) optimizing wheel slip of a land or aircraft vehicle with respect to a ground surface to maximize braking performance of a wheel against a ground surface during ABS braking by an operator of the vehicle comprising:
    brake means responsive to operator braking for generating an applied brake torque that is applied to a wheel brake to initiate braking at the contact point of the wheel and the ground surface;
    a wheel speed sensor that periodically measures wheel speed;
    a sliding mode observer that estimates an estimated differential wheel torque from each wheel speed measurement that represents the difference between wheel braking torque, generated at the contact point of the wheel and the ground surface, and the applied brake torque;
    an extrema detector that compares each value of estimated differential wheel torque to a preceding value of estimated differential wheel torque to detect an extremum of estimated differential wheel torque; and
    a controller that interrupts braking by the brake means upon detection of an extremum during ABS braking, thereby causing applied brake torque to decrease.

2. The antilock braking system of claim 1, wherein the extrema detector compares successive values of estimated differential wheel torque by calculating the time derivative of each estimated differential wheel torque in a series of estimated differential wheel torques and detecting a zero value of calculated time derivative of estimated differential wheel torque that signifies the extremum in the series of estimated differential wheel torques.

3. The antilock braking system of claim 1, wherein the controller restores braking by the brake means upon detection of an extremum during an interval in which braking is interrupted, thereby causing applied brake torque to increase.

4. The antilock braking system of claim 1, wherein the controller alternately interrupts and restores braking by the brake means upon detection of each extremum in a series of detected estimated differential wheel torque extrema, thereby causing applied brake torque to decrease and increase, respectively.

5. The antilock braking system of claim 4, wherein the brake means further comprises a brake actuator, and the controller further comprises:
   means for generating an actuator control signal having a first state or a second state;
   means responsive to the detection of an extremum for changing the state of the actuator control signal; and
   means for applying the actuator control signal to the brake actuator to interrupt generation of the applied brake torque when the actuator control signal is in the first state, thereby causing applied brake torque to decrease, and to restore generation of the applied brake torque when the actuator control signal is in the second state, thereby causing applied brake torque to increase.

6. The antilock braking system of claim 5, further comprising excessive slip detection means for detecting an excessive slip condition at the contact point of the wheel and the ground surface and for changing the state of the actuator control signal to the second state during detection of an excessive slip condition if not already in the second state.

7. The antilock braking system of claim 6, wherein the excessive slip detection means further comprises:
   means for creating a time-delayed wheel speed measurement;
   means for calculating a first wheel speed ratio of a current wheel speed measurement to a time-delayed wheel speed measurement;
   means for computing a second wheel speed ratio equal to unity minus the first wheel speed ratio and equivalent to the subtracting the current wheel speed measurement from the delayed wheel speed measurement and dividing this quantity by the delayed wheel speed measurement;
   means for comparing said second wheel speed ratio to an upper threshold indicative of an excessive slip condition and a lower threshold indicative of an acceptable condition;
   means for creating an actuator control signal where said actuator control signal is the product of a primary actuator control signal which controls the actuator under the condition of an acceptable slip and a second, binary, actuator control signal where the secondary actuator control signal has an initial default value of unity and is set to zero whenever the second wheel speed ratio signal exceeds the upper threshold and is reset to unity whenever the second wheel speed ratio falls below the lower threshold; and
   means responsive to the actuator control signal for interrupting generation of the applied brake torque by the brake means, thereby causing applied brake torque to decrease, when the second wheel speed ratio exceeds the upper threshold and until the second wheel speed ratio falls below the lower threshold.

8. The antilock braking system of claim 1, further comprising excessive slip detection means for detecting an excessive slip condition at the contact point of the wheel and the ground surface and for changing the state of the actuator control signal to the second state during detection of an excessive slip condition, thereby causing applied brake torque to decrease.

9. The antilock braking system of claim 1, wherein:
   the brake means further comprises a brake actuator,
   the extrema detector compares successive values of estimated differential wheel torque by
      calculating the time derivative of each estimated differential wheel torque in a series of estimated differential wheel torques and
      detecting a zero value of calculated time derivative of estimated differential wheel torque that signifies the extremum in the series of estimated differential wheel torques; and
   the controller further comprises:
      means for generating an actuator control signal having a first state or a second state;
      means responsive to the detection of an extremum for changing the state of the actuator control signal; and
      means for applying the actuator control signal to the brake actuator to interrupt generation of the applied brake torque when the actuator control signal is in the first state, thereby causing applied brake torque to decrease, and to restore generation of the applied brake torque when the actuator control signal is in the second state, thereby causing applied brake torque to increase.

10. The antilock braking system of claim 1, wherein:
    the brake means further comprises a brake actuator;
    the extrema detector comprises means for sampling and holding the estimated differential wheel torque value when the extremum is detected; and
    the controller further comprises:
      means for generating an actuator control signal having a first state or a second state;
      means for establishing a brakes on/off threshold;
      means for comparing the held estimated differential wheel torque value to the brakes on/off threshold value;
      means for setting the state of the actuator control signal to the first state when the held estimated differential wheel torque value equals or exceeds the brakes on/off threshold value and the brake actuator is in the second state;
      means for setting the state of the actuator control signal to the second state when the held estimated differential wheel torque value is less than the brakes on/off threshold value and the brake actuator is in the first state; and
      means for applying the actuator control signal to the brake actuator to interrupt generation of the applied brake torque when the actuator control signal is in the first state, thereby causing applied brake torque to decrease, and to restore generation of the applied brake torque when the actuator control signal is in the second state, thereby causing applied brake torque to increase.

11. In a vehicle braking system, an antilock braking (ABS) method optimizing wheel slip of a land or aircraft vehicle with respect to a ground surface to maximize braking performance of a wheel against a ground surface during ABS braking by an operator of the vehicle comprising:

generating an applied brake torque that is applied to a wheel brake to initiate braking at the contact point of the wheel and the ground surface thereby causing applied brake torque to increase;

periodically measuring wheel speed;

estimating the differential wheel torque from each wheel speed measurement that represents the difference between wheel braking torque, generated at the contact point of the wheel and the ground surface, and the applied brake torque;

comparing each value of estimated differential wheel torque to a preceding value of estimated differential wheel torque to detecting an extremum of estimated differential wheel torque; and interrupting braking by the brake means upon detection of an extremum during ABS braking, thereby causing applied brake torque to decrease.

12. The antilock braking method of claim 11, wherein the vehicle braking system comprises a brake actuator, and the further comprising:

generating an actuator control signal having a first state or a second state;

changing the state of the actuator control signal in response to the detection of an extremum; and applying the actuator control signal to the brake actuator to interrupt generation of the applied brake torque when the actuator control signal is in the first state, thereby causing applied brake torque to decrease, and to restore generation of the applied brake torque when the actuator control signal is in the second state, thereby causing applied brake torque to increase.

13. The antilock braking method of claim 12, further comprising:

detecting an excessive slip condition at the contact point of the wheel and the ground surface; and changing the state of the actuator control signal to the second state during detection of the undesirable excessive slip condition if not already in the second state.

14. The antilock braking method of claim 13, wherein the excessive slip detection means further comprises:

creating a time-delayed wheel speed measurement calculating a first wheel speed ratio of a current wheel speed measurement to a time-delayed wheel speed measurement computing a second wheel speed ratio equal to unity minus the first wheel speed ratio and equivalent to the subtracting the current wheel speed measurement from the delayed wheel speed measurement and dividing this quantity by the delayed wheel speed measurement;

comparing said second wheel speed ratio to an upper threshold indicative of an excessive slip condition and a lower threshold indicative of an acceptable slip condition;

creating an actuator control signal where said actuator control signal is the product of a primary actuator control signal which controls the actuator under the condition of an acceptable slip and a second, binary, actuator control signal where the secondary actuator control signal has an initial default value of unity and is set to zero whenever the second wheel speed ratio signal exceeds the upper threshold and is reset to unity whenever the second wheel speed ratio falls below the lower threshold; and interrupting generation of the applied brake torque by the brake means, thereby causing applied brake torque to decrease, when the second wheel speed ratio exceeds the upper threshold and until the second wheel speed ratio falls below the lower threshold.

15. The antilock braking method of claim 11, further comprising:

alternately interrupting and restoring braking by the brake means upon detection of each extremum in a series of detected estimated differential wheel torque extrema, thereby causing applied brake torque to decrease and increase, respectively.

16. The antilock braking method of claim 11, wherein the comparing step further comprises calculating the time derivative of each estimated differential wheel torque in a series of estimated differential wheel torques and detecting a zero value of calculated time derivative of estimated differential wheel torque that signifies the extremum in the series of estimated differential wheel torques.

17. The antilock braking method of claim 11, further comprising:

restoring braking by the brake means upon detection of an extremum during an interval in which braking is interrupted, thereby causing applied brake torque to increase.

18. The antilock braking method of claim 11, further comprising detecting an excessive slip condition at the contact point of the wheel and the ground surface; and interrupting generation of the applied brake torque by the brake means during detection of the excessive slip condition, thereby causing applied brake torque to decrease.

19. The antilock braking method of claim 11, wherein the braking system further comprises a brake actuator, and the comparing step further comprises:

calculating the time derivative of each estimated differential wheel torque in a series of estimated differential wheel torques; and detecting a zero value of a calculated time derivative of estimated differential wheel torque that signifies the extremum in the series of estimated differential wheel torques; and further comprising:

generating an actuator control signal having a first state or a second state;

changing the state of the actuator control signal in response to the detection of an extremum; and applying the actuator control signal to the brake actuator to interrupt generation of the applied brake torque when the actuator control signal is in the first state, thereby causing applied brake torque to decrease, and to restore generation of the applied brake torque when the actuator control signal is in the second state, thereby causing applied brake torque to increase.

20. The antilock braking method of claim 11, wherein the braking system further comprises a brake actuator, and further comprising:

sampling and holding the estimated differential wheel torque value when the extremum is detected; and generating an actuator control signal having a first state or a second state;

establishing a brakes on/off threshold;

comparing the held estimated differential wheel torque value to the brakes on/off threshold value;

setting the state of the actuator control signal to a first state when the held estimated differential wheel torque value equals or exceeds the brakes on/off threshold value and the brake actuator is in the second state;

setting the state of the actuator control signal to a second state when the held estimated differential wheel torque value is less than the brakes on/off threshold value and the brake actuator is in the first state; and applying the actuator control signal to the brake actuator to interrupt generation of the applied brake torque when the actuator control signal is in the first state, thereby causing applied brake torque to decrease, and to restore generation of the applied brake torque when the actuator control signal is in the second state, thereby causing applied brake torque to increase.

21. An antilock braking (ABS) method optimizing wheel slip of a land or aircraft vehicle with respect to a ground surface to maximize braking performance of wheel against a ground surface during ABS braking by an operator of the vehicle engaging brake means, for generating an applied brake torque that is applied to a wheel brake to initiate braking at the contact point of the wheel and the ground surface or for interrupting generation of the applied brake torque, the method comprising:

(a) measuring wheel speed;
(b) estimating the differential wheel torque from wheel speed measurement that represents the difference between wheel braking torque, generated at the contact point of the wheel and the ground surface, and the applied brake torque;
(c) comparing each value of estimated differential wheel torque to a preceding value of estimated differential wheel torque to detecting an extremum of estimated differential wheel torque; and
(d) alternately interrupting and restoring generation of the applied brake torque by the brake means upon detection of each extremum in a series of detected estimated differential wheel torque extrema, thereby causing the applied brake torque to alternately decrease and increase, respectively.

22. The antilock braking method of claim 21, wherein the braking system comprises a brake actuator, and step (d) further comprises:

generating an actuator control signal having a first state or a second state;
changing the state of the actuator control signal in response to the detection of an extremum; and
applying the actuator control signal to the brake actuator to interrupt generation of the applied brake torque when the actuator control signal is in the first state, thereby causing applied brake torque to decrease, and to restore generation of the applied brake torque when the actuator control signal is in the second state, thereby causing applied brake torque to increase.

23. The antilock braking method of claim 21, wherein the comparing step further comprises calculating the time derivative of each estimated differential wheel torque in a series of estimated differential wheel torques and detecting a zero value of calculated time derivative of estimated differential wheel torque that signifies the extremum in the series of estimated differential wheel torques.

24. An antilock braking (ABS) method optimizing wheel slip of a land or aircraft vehicle with respect to a ground surface to maximize braking performance of a wheel against a ground surface during ABS braking by an operator of the vehicle engaging brake means for generating an applied brake torque that is applied to a wheel brake to initiate braking at the contact point of the wheel and the ground surface, the method comprising:

periodically measuring wheel speed;
estimating differential wheel torque from each wheel speed measurement that represents the difference between wheel braking torque, generated at the contact point of the wheel and the ground surface, and applied brake torque generated by the vehicle braking system;
comparing each value of estimated differential wheel torque to a preceding value of estimated differential wheel torque to detect extrema of estimated differential wheel torque; and
regulating the applied brake torque as a function of detected extrema of differential wheel torque to maintain the friction at the contact point of the wheel and the ground surface near its peak value during heavy braking.

25. The antilock braking method of claim 24, wherein the comparing step further comprises calculating the time derivative of each estimated differential wheel torque in a series of estimated differential wheel torques and detecting a zero value of calculated time derivative of estimated differential wheel torque that signifies the extremum in the series of estimated differential wheel torques.

* * * * *